(12) United States Patent
Targett et al.

(10) Patent No.: US 7,514,101 B2
(45) Date of Patent: Apr. 7, 2009

(54) ARTIFICIAL BAIT BASED ON A PEPTIDE ATTRACTANT FOUND IN HORSESHOE CRAB EGGS

(75) Inventors: Nancy Targett, Lewes, DE (US);
Kirstin Wakefield, Milton, DE (US);
Pamela Green, Newark, DE (US);
Yu-Sung Wu, Newark, DE (US);
Jennifer Costanza, Washington, DC (US)

(73) Assignee: University of Delaware, Newark, DE (US)

( * ) Notice: Subject to any disclaimer, the term of this patent is extended or adjusted under 35 U.S.C. 154(b) by 22 days.

(21) Appl. No.: 11/039,554

(22) Filed: Jan. 19, 2005

(65) Prior Publication Data

US 2005/0220892 A1 Oct. 6, 2005

Related U.S. Application Data

(60) Provisional application No. 60/537,538, filed on Jan. 20, 2004, provisional application No. 60/546,630, filed on Feb. 20, 2004.

(51) Int. Cl.
*A61K 35/64* (2006.01)
*A01N 37/18* (2006.01)

(52) U.S. Cl. .......................................... 424/538; 514/2
(58) Field of Classification Search ........................ None
See application file for complete search history.

(56) References Cited

U.S. PATENT DOCUMENTS 4,463,018 A * 7/1984 Carr ............................... 426/1
4,731,247 A * 3/1988 Wolford et al. ................ 426/1
5,133,959 A 7/1992 Kumins
6,269,586 B1 8/2001 Jones
6,391,295 B1 5/2002 Novitsky et al.

OTHER PUBLICATIONS

Horseshoe Crab Spawing [online]. Fisheries Service, Maryland Department of Natural Resources, no date given [retrieved on May 2, 2007]. Retrieved from the Internet: <URL: www.dnr.state.md.us/fisheries/articles/hsc0404.shtml>.*
Ferrari KM et al. 2003. Chemical attractants in horseshoe crab. Limulus polyphemus, eggs: The potential for an artificial bait. J Chem Ecol 29: 477-496.*
Liang J-R et al. 2000. Biochemical compositions of *Tachypleus tridentatus* at embryonic development stage. Zhongguo Shuichan Kexue 7: 113-115. Abstract Only; 1 page.*
Padayatty SJ et al. Vitamin C as an antioxidant: evaluation of its role in disease prevention. J Am Coll Nutr 22: 18-35.*
Shuster, Jr., et al. "Growing up takes about ten years and eighteen stages." in: Shuster, Jr., ed., The American Horseshoe Crab (Cambridge MA, Harvard University Press, 2003), pp. 103-104. QL447.7 .A44 2003.*

* cited by examiner

*Primary Examiner*—Lora E Barnhart
(74) *Attorney, Agent, or Firm*—McCarter & English

(57) ABSTRACT

The present invention relates to a novel attractant for fish and mollusks isolated from the eggs of the horseshoe crab, *Limulus polyphemus*. The invention also relates to a method for attractant peptide extraction, separation, purification, quantitation, and characterization of function. In other aspects, the invention provides for the isolation of the attractant peptide from horseshoe crab eggs for use as "bait" for attracting fish and mollusks. More particularly, the invention relates to the use of biochemical approaches to characterize a peptide attractant, and provides for the creation of recombinant or synthetic attractant peptides, and their use.

24 Claims, 13 Drawing Sheets

Horseshoe crab eggs (thawed at room temperature)

Grind with mortar and pestle

Add to TRIS-HCl buffer
in 2:1 ratio buffer:eggs

Put in 4°C overnight

Remove from 4°C

Filter through cheesecloth

Spin on tabletop centrifuge  Supernatant A
10 min, 8000 rpm

Discard pellet  Heat at 95°C
for 5 min

Spin at 10,000 g  Supernatant B
for 30 min

Discard pellet  Discard pellet

ARTIFICIAL BAIT BASED ON A PEPTIDE ATTRACTANT FOUND IN HORSESHOE CRAB EGGS

CROSS REFERENCE TO RELATED APPLICATIONS

This application claims the benefit of U.S. Provisional Application No. 60/537,538, filed Jan. 20, 2004, and U.S. Provisional Application No. 60/546,630, filed Feb. 20, 2004, the contents of which are incorporated herein by reference.

RELATED FEDERALLY SPONSORED RESEARCH

The work described in this application was sponsored by the National Oceanic and Atmospheric Administration under Contract Number NA96RG0029.

FIELD OF THE INVENTION

This invention relates to the isolation and characterization of an attractant for fish and mollusks found in the eggs of the horseshoe crab, *Limulus polyphemus*. More particularly, the invention relates to the identification of the characteristics of a peptide attractant for fish and the development of an independent or artificial source of the attractant for use as bait.

BACKGROUND OF THE INVENTION

The horseshoe crab, *Limulus polyphemus*, has been in existence for millions of years. Few sources of natural mortality exist. Predation by sea turtles, habitat degradation, spawning in sub-optimal habitats, algal infestation and gill ballooning are threats to the *Limulus* population. None of these, however, affects the population as seriously as human harvesting for use as bait.

Today, the horseshoe crab is an important multi-use resource that impacts the ecology and economy of the Atlantic Coast of the United States. In addition to having an established ecological role (e.g. in providing food for migratory birds), the horseshoe crab has also provided significant contributions to medicine. Chitin from the horseshoe crab's carapace can be used in dressing wounds of burn victims and in sutures. Additionally, a large body of research on the *Limulus* eye has provided insight to the functioning of the human eye. The most significant contribution of *L. polyphemus* to medicine, however, has been the discovery of *Limulus* amebocyte lysate (LAL). LAL is a clotting agent derived from the blood of the horseshoe crab that is now used as the sole test for endotoxins in medical equipment and intravenous drugs. Specifically, LAL coagulates in the presence of gram-negative bacterial endotoxins allowing for effective prevention and diagnosis of infections. LAL has revolutionized the medical industry by reducing the need for animal testing, thus making the practice of medicine safer and more efficient. Since the implementation of an FDA mandate requiring bacterial tests of all medical items for use in humans, LAL production has evolved into a million dollar industry.

In 1999, approximately 250,000 horseshoe crabs were captured and bled for LAL production. This number virtually doubled over 10 years from 130,000 in 1989, and the numbers continue to increase. Bled crabs are not destroyed. Instead they are required to be released after 72 hours of bleeding under FDA regulation. This regulation, however, may soon become optional as a proposed amendment to the Interstate Fishery Management Plan (FMP) would allow horseshoe crabs that are harvested for bait to be bled first and then used as bait. This amendment was passed in May 2004.

Horseshoe crabs have long been harvested as bait in the eel, conch, lobster and catfish fisheries. Specifically, the demand for horseshoe crabs now centers on the American eel and conch fisheries along the Atlantic coast of the US where horseshoe crabs are used to bait pots and traps. Eel are popular in that they are used primarily as bait by recreational fishermen throughout the US, as well as for human consumption, much of which involves exportation to Asia countries. There exists both a national and international market for conch meat as well. Eel and conch fishermen report that female horseshoe crabs are superior bait to fish, and result in superior catches that increase daily profits. Interestingly, female horseshoe crabs are considered superior bait to even male horseshoe crabs in the eel fishery, and, in fact this fishery generally uses only female horseshoe crabs as bait. As for conch fisheries, in 2000, a reported 97% of conch landings were caught with horseshoe crabs (Manion et al. 2000).

With the demand so high, it is estimated that 5000 female horseshoe crabs are used as bait per fisherman per year. In Delaware only 77 permits were issued for eel fishing in 2004, which translates to approximately 385,000 female horseshoe crabs removed from the reproductive population. Conch fisheries are estimated to remove 22,000 horseshoe crabs per fisherman per year. As large as these numbers are, they do not even include harvesting in other states (e.g. New Jersey issued 34 permits for *Limulus* harvesting in 2003).

The favored use of female horseshoe crabs places added pressure on the *Limulus* population. Once they reach maturity (approximately 9-12 years), female horseshoe crabs can lay as many as 80,000 eggs each year and typically spawn for many years. Under basic ecological principles, extraction of thousands of females from the population reduces the reproductive fitness of the population, thereby eliminating the potential for population growth.

Measures, at both the State and Federal levels, have been taken to minimize the loss in the horseshoe crab population. For instance, some states now require fishermen to purchase permits for legally harvesting horseshoe crabs and further require them to report their harvesting numbers each year. In addition, some states have placed restrictions on certain times of the day as well as certain days of the week when harvesting is allowed. Finally, some states require the use of bait bags. Even with these measures in place, however, problems continue to exist as enforcement is difficult and underreporting by permit holders occurs more often than not. Recently, Delaware attempted to institute emergency restrictions, but were met with considerable resistance by local fishermen who rely on horseshoe crabs to support their eel and conch catches, and, as such, their livelihood.

Therefore, there is a need for a long-term, sustainable alternative to the preferential use of horseshoe crabs as bait in the eel and conch fisheries. The development and implementation of an artificial bait in the eel and conch fisheries is one way to prevent decline of the horseshoe crab population. An effective artificial bait must be species-specific, cost effective, easy to store and transport, easy to prepare, able to withstand environmental changes and long periods of immersion, and functional at low concentrations of attractant. Additionally, a bait matrix must be resistant to penetration and destruction by microbes, thereby preserving the integrity of the attractant.

The inventors have determined the characteristics of an attractant found in horseshoe crab eggs and have used such characteristics to develop an artificial bait that does not rely on the natural source of the horseshoe crab egg attractant.

SUMMARY OF THE INVENTION

The invention is directed to a composition comprising a substantially purified attractant, wherein the attractant:
a) has a molecular weight of less than about 30 kilodaltons;
b) is naturally present in the egg of a horseshoe crab;
c) contains at least one peptide bond;
d) has a lysine or arginine at its carboxy terminus;
e) is not lipid based;
f) is water-soluble; and
g) functions as an attractant of aquatic organisms at about sub-molar concentrations.

The invention is also directed to a composition useful as an attractant or bait for aquatic organisms comprising a peptide derived from a horseshoe crab egg, wherein said peptide has the formula, $aa_n$, where aa is an amino acid and n is an integer from about 2 to about 250.

The invention is further directed to an agent useful as an attractant or bait for aquatic organisms comprising a peptide derived from a horseshoe crab egg, wherein said peptide has the formula:

$aa_n$—$X_z$, wherein:
aa is an amino acid;
n is an integer from about 2 to about 250;
X is a carboxyl terminal basic amino acid residue, for example arginine or lysine; and
z is an integer $\geq 1$.

The invention is additionally directed to a method for the isolation and purification of a peptide attractant from at least one horseshoe crab egg comprising the steps of:
a) providing at least one egg of a *Limulus polyphemus*, horseshoe crab;
b) disrupting the egg;
c) extracting egg lysate using a suitable volume of a suitable buffer to produce an extract;
d) filtering said extract; and
e) treating the filtered extract to one or more centrifugation steps, heating steps or a combination of both.

The invention is finally directed to a method of using a peptide attractant of claim 21, comprising the steps of:
a) providing the peptide attractant, wherein the peptide is, isolated and purified directly from at least one *Limulus polyphemus*, horseshoe crab egg, a purified recombinant peptide, a synthetic peptide, or any combination thereof;
b) providing a means for catching an aquatic organism; and
c) adding the peptide attractant on or around the catching means.

DETAILED DESCRIPTION OF THE INVENTION

Figure 1:
FIG. 1 is a flow chart depicting the steps of horseshoe crab egg extract preparation.
Figure 1:
Figure 1:
Figure 1:
Figure 1:
Figure 1:
Figure 1:
Figure 1:
Figure 1:
Figure 1:
Figure 1:
Figure 1:
Figure 1:

The invention is directed to the isolation and further characterization of a naturally existing bait attractant, particularly suitable for the eel and conch fisheries. The bait attractant has been purified from the eggs of horseshoe crabs, *Limulus polyphemus*. The inventors have isolated and characterized this attractant in order to provide a means to develop an independent source of the attractant, or, in other words, an artificial bait for eel and conch that does not affect the horseshoe crab population.

Certain characteristics have been determined regarding the novel bait attractant of the invention. Initially, it is the inventors' finding that the attractant is found to exist naturally in the eggs of horseshoe crabs, particularly, *Limulus polyphemus*. The active attractant has a low molecular weight within the range of 0.5 kDa to 3 kDa. It is further determined that the active horseshoe crab attractant is a peptide with an arginine or lysine at the carboxy terminus. Based on protein content, it is estimated that the active concentration of the attractant falls within the nanomolar range, a range typical for other aquatic signal molecules. The attractant is determined to be water-soluble and not lipid-based, and has a wavelength absorbance of 215 nm based on HPLC data. While the exact melting point of the horseshoe crab attractant is not yet known, but supernatant B extract (See Example 1) retains activity after heating at 95 C and autoclaving (120 C). Finally, based on the cation/anion exchange chromatography (Targett and Ferrari paper), the horseshoe crab attractant is not strongly charged when it's a component of supernatant B.

While it was known in the art that horseshoe crabs were particularly effective for use as bait for eel and conch, it was not known what the attractant was, where the attractant was localized or what its characteristics were. The present invention provides the novel findings that answer these questions.

Purification

The horseshoe crab attractant of the present invention can be separated and substantially purified from horseshoe crab eggs using general extraction and filtration techniques known in the art. Snail bioassays and field trials have all demonstrated the purification of a biologically active horseshoe crab bait attractant.

Preferably, horseshoe crab eggs are ground with, for example, a mortar and pestle, and then extracted using, for example, a neutral pH Tris buffer. Extract can then be repeatedly filtered and centrifuged using standard techniques. A preferred horseshoe crab extract is that designated as supernatant B shown in FIG. 1 and described in Example 1. In fact, throughout this document, unless referred to otherwise, the term "horseshoe crab extract" shall mean horseshoe crab extract of the purity set forth in supernatant B of FIG. 1.

Bioactivity of the Horseshoe Crab Extract

Snail bioassays were used to determine the bioactivity of the horseshoe crab extract. Mud snails, *Ilyanassa obsoleta*, are used in the art to prove bioactivity of aquatic attractants because they are known to exhibit directional bias to the right in the absence of a cue, and exhibit natural trail following behavior. Baseline assays indicated that a directional bias in the snails did not affect the results of the snail bioassays. When tested against a control of seawater, the mud snail was significantly attracted to the horseshoe crab extract of horseshoe crab, *L. polyphemus*, eggs (see Example 2).

Size of Attractant

Through dialysis experiments, strong evidence was found that the horseshoe crab active attractant itself falls within the range of 0.5 kDa to 3 kDa in size, thus falling within the range of a peptide. While the data also disclosed an attractive effect even for the cruder extract of the 10 kDa-50 kDa size, this is the result of aggregation that is occurring. Specifically, it is inventors' position that when a higher concentration of the extract is placed in the dialysis bag, the proteins aggregate into a larger complex that is retained in the bag.

Following HPLC purification and MALDI-TOF analysis of the horseshoe crab extract, it was determined that a more preferred size of the horseshoe crab active attractant is within the range of 1 kDa to 2 kDa. A peak obtained from HPLC that likely identifies the horseshoe crab attractant was of a size of 1567 Da (see Example 8).

Characterization as a Peptide

The inventors have determined that the horseshoe crab attractant is a peptide. In addition to having a size range (0.5 kDa to 3 kDa) that is normal for a peptide, the inventors have further determined the presence of arginine or lysine at the carboxy terminus of the attractant, thus further supporting the position that the attractant is a peptide. It is well known in the art that the presence of arginine or lysine at the carboxy terminus is a common characteristic of several aquatic peptide cues.

It is known in the art that the presence of arginine or lysine at the carboxy terminus can be demonstrated in experiments with various carboxypeptidases, which cleave the terminal amino acid from the carboxyl end of a peptide sequence. Incubating horseshoe crab extract with carboxypeptidase A does not degrade the attractant. Because carboxypeptidase A is known to cleave all carboxy-terminus amino acids except arginine and lysine, one or both of these amino acids is present at the carboxy terminus of the horseshoe crab attractant. This position is further supported because when the horseshoe crab extract is incubated with carboxypeptidase B (which cleaves only lysine and arginine from the carboxy terminus) it results in decreased activity. The effects of enzymatic digestion with carboxypeptidases A and B has been documented in other aquatic peptide signals and provides strong evidence that the peptide attractant in *Limulus polyphemus* eggs has either an arginine or lysine at the craboxy terminus.

Further studies with the N-glycosidase-F showed that the horseshoe crab attractant does not have N-glycans attached, as the incubation of the horseshoe crab attractant with the N-glycosidase-F enzyme did not affect the activity of the extract.

Effective Concentration of the Attractant

The attractant was determined to have a detection level within the range of from about 1 nM to about 10 mM. In a more preferred embodiment the attractant has a detection level of from about $3\times10(-5)$ mM to about $4\times10(-5)$ mM, and more particularly, a detection level of about $3.378\times10^{-5}$ mM (See Example 3). This detection level lies within the range of activity of other known chemical attractants.

Experiments conducted over concentrations that ranged from 30 microliters to 3 milliliters of horseshoe crab extract diluted into 1 liter of seawater consistently achieved significant positive response from the mud snail, *I. obsoleta*. *L obsoleta*, therefore responds to a wide variety of concentrations, as is typical of aquatic organisms. At higher concentrations, there is a decrease in response which might be expected if the organisms are habituating to the cue or if they are being saturated so that the signal is no longer effective. The peptide attractant most likely occurs in lower concentrations in the ambient environment and higher concentrations in the horseshoe crab eggs.

The information obtained by establishing the lowest detectable volume of horseshoe crab extract can be used to estimate the maximum molar concentrations for comparison with other chemical attractants. Using the Bradford Method, the protein content of the horseshoe crab extract was determined. One milliliter of horseshoe crab extract spun at 10,000 g (Supernatant B) has a protein content of 1.125 mg/ml. It can then be calculated that 30 µl of extract has a protein content of $3.378\times10(-5)$ grams. Because the size of the attractant is within the range of from about 1000 Da to about 2000 Da (from the dialysis experiment results) and based on the assumption that 100% of the extract protein is the attractant, then that means that $3.378\times10(-8)$ moles (30 mM) were added to 1 L of seawater in the bioassays with *Ilyanassa obsoleta*. This translates into about a $3.378\times10(-5)$ mM detection level, which again lies within the range of activity of other known aquatic feeding attractants.

This detection level further supports the inventors' position that the horseshoe crab attractant is a peptide with several qualities common to other aquatic peptide cues. Additionally, because the horseshoe crab attractant is effective in nanomolar concentrations, it is advantageous for the production of an artificial bait because it will require less attractant per volume of bait.

Preliminary field trials with bait prototypes were run with eel and conch fishermen. The horseshoe crab extract was used as the prototype and these prototypes were determined to be competitive with natural horseshoe crab bait as they did not require refrigeration, retained their integrity over several tidal cycles, were cost effective and appeared to produce catches similar to those of natural bait.

Mass Spectrometry

As used herein, the general term "mass spectrometry" ("MS") refers to any suitable mass spectrometry method, device or configuration including, e.g., electrospray ionization (ESI), matrix-assisted laser desorption/ionization (MALDI) MS, MALDI-time of flight (TOF) MS, atmospheric pressure (AP) MALDI MS, vacuum MALDI MS, tandem MS (MS/MS), or any combination thereof. Mass spectrometry devices measure the molecular mass of a molecule (as a function of the molecule's mass per charge ratio) by measuring the molecule's flight path through a set of magnetic and electric fields. Such devices are well known and are widely used in the field of bio-molecular research. In proteomics research, for example, tandem mass spectrometry (MS/MS) is used to identify proteins. Another technique for studying biological molecules is the use of a matrix-assisted laser desorption ionization (MALDI) mass spectrometry apparatus, wherein a biological sample is embedded in a volatile matrix which is subsequently vaporized by an intense laser emission. One such MALDI mass spectrometry apparatus is a MALDI-TOF apparatus (TOF is time-of-flight spectrometry). In the field of proteomics, mass spectrometry, and in particular, MALDI-TOF techniques are used to determine the molecular weight of peptides produced by digestion of isolated proteins. The present invention includes the use of high performance liquid chromatography (HPLC) followed by MALDI analysis of the peptides.

A detailed overview of mass spectrometry methodologies and devices can be found in the following references which are hereby incorporated by reference: Carr, S. A., and Annan R. S. Overview of peptide and protein analysis by mass spectrometry. In: Current Protocols in Molecular Biology, edited by Ausubel, F. M., Brent, R., Kingston, R. E., Moore, D. D., Seidman, J. G., Smith, J. A., and Struhl, K. New York: Wiley 1997, p. 10.21.1-10.21.27; Paterson, S. D., and Aebersold, R. Mass spectrometric approaches for the identification of gel-separated proteins. Electrophoresis 16: 1791-1814 (1995); Patterson, S. D. Protein identification and characterization by mass spectrometry. In: Current Protocols in Molecular Biology, edited by Ausubel, F. M., Brent, R., Kingston, R. E., Moore, D. D., Seidman, J. G., Smith, J. A., and Struhl, K. New York: Wiley 1998, p. 10.22.1-10.22.24.

Sources of the Artificial Attractant

In view of the above, the horseshoe crab attractant appears to be another example of the peptide class of chemical cues. Therefore, there are a variety of known methods that can be used to generate a source of the attractant that is independent of the horseshoe crab, or, in other words, an artificial attractant. In addition, because the attractant is effective in nanomolar concentrations, such an artificial bait can be advantageous over natural bait as less product will be required.

Recombinant Techniques

An alternative feasible route to developing an artificial bait would be to use recombinant techniques for cloning and expressing the protein in a suitable biological system.

Definitions

The following definitions apply throughout the application unless otherwise specified:

The term "nucleic acid" refers to deoxyribonucleotides, deoxyribonucleic acids, ribonucleotides, and ribonucleic acids, and polymeric forms thereof, and includes either single- or double-stranded forms. Also, unless expressly limited, the term "nucleic acid" includes known analogues of natural nucleotides that have similar binding properties as the reference nucleic acid. In addition, a particular nucleotide or nucleic acid sequence includes conservative variations (e.g. degenerate codon substitutions), complementary sequences, and the sequence explicitly indicated. A degenerate codon substitution is one in which the third position of one or more selected codons is substituted with any nucleotide which results in the same amino acid. The term nucleic acid is generic to the terms "gene", "DNA," "cDNA", "oligonucleotide," "RNA," "mRNA," "nucleotide," "polynucleotide," and the like.

As used herein, the term "oligonucleotide" refers to a series of linked nucleotide residues, which oligonucleotide has a sufficient number of nucleotide bases to be used in a PCR reaction. A short oligonucleotide sequence may be based on, or designed from, a genomic or cDNA sequence and is used to amplify, confirm, or reveal the presence of an identical, similar or complementary DNA or RNA in a particular cell or tissue. Oligonucleotides may be chemically synthesized and may also be used as probes.

"Nucleic acid template," or "parental nucleic acid" refers to a nucleic acid that has served as a template for a subsequent step or process. Thus, an mRNA, a cDNA reverse transcribed from an mRNA, an RNA transcribed from that cDNA, a DNA amplified from the cDNA, an RNA transcribed from the amplified DNA, etc., are all derived from the gene and detection of such derived products is indicative of the presence and/or abundance of the original gene and/or gene transcript in a sample.

The term "gene" is used broadly to refer to any segment of nucleic acid associated with expression of a given RNA or protein. Thus, genes include regions encoding expressed RNAs (which typically include polypeptide coding sequences) and, often, the regulatory sequences required for their expression. Genes can be obtained from a variety of sources, including cloning from a source of interest or synthesizing from known or predicted sequence information, and may include sequences designed to have specifically desired parameters.

A "recombinant" nucleic acid is any nucleic acid produced by an in vitro or artificial (meaning not naturally occurring) process or by recombination of two or more nucleic acids. Recombinant nucleic acids of the invention may be manipulated or modified by any means available to those skilled in the art, for example, digestion with restriction endonuclease, ligation to other nucleic acids, subcloning into plasmids for propagation or expression in a host cell, methylation, and the like.

The term "host cell" includes a cell that might be used to carry a heterologous nucleic acid, or expresses a peptide or protein encoded by a heterologous nucleic acid. A host cell can contain genes that are not found within the native (non-recombinant) form of the cell, genes found in the native form of the cell where the genes are modified and re-introduced into the cell by artificial means, or cells that contain a nucleic acid endogenous to the cell that has been artificially modified without removing the nucleic acid from the cell.

Nucleic acid modifications inlcude those obtained by gene replacement, site-specific mutation, shuffling, endonuclease digestion, PCR, subcloning, and related techniques. A "plurality of forms" of a selected nucleic acid is used to refer to a plurality of nucleic acids derived from the same parental nucleic acid, or a plurality of homologs of the nucleic acid. The homologs can be naturally occurring, or created by artificial synthesis of one or more nucleic acids having related sequences, or by modification of one or more nucleic acid to produce related nucleic acids. Nucleic acids are homologous when they are derived, naturally or artificially, from a common ancestor sequence. For purposes of the present invention, genes are homologous if the sequences are sufficiently similar to allow recombination.

As used herein, the term "polypeptide" refers to amino acids, peptides, peptide mimics, modified peptides, proteins, and complexes composed of any combination thereof.

As used herein, a "mature" form of a polypeptide or protein disclosed in the present invention is the product of a naturally occurring polypeptide or precursor form or proprotein. The naturally occurring polypeptide, precursor or proprotein includes, by way of nonlimiting example, the full-length gene product, encoded by the corresponding gene. Alternatively, it may be defined as the polypeptide, precursor or proprotein encoded by an ORF described herein.

The phrase "hybridizing," refers to the binding, duplexing, or hybridizing of a molecule only to a particular nucleotide sequence under stringent conditions, including when that sequence is present in a complex mixture (e.g., total cellular) DNA or RNA.

"Conservative mutations" of a nucleic acid sequence refers to those nucleotides that encode identical or essentially identical amino acid sequences, or where the nucleotide does not encode an amino acid sequence, to essentially identical sequences. This is based on the fact that the genetic code is "degenerate," that is to say a number of distinct nucleic acids encode for the same amino acid. For instance, the codons GTT, FTA, GTC, and GTG all encode the amino acid valine. Thus, at every position where a valine is specified by a codon, the codon can be altered to any of the corresponding codons described without altering the encoded polypeptide. Such nucleic acid variations are "silent mutations," which are one species of "conservative mutation." One of ordinary skill will recognize that each codon in a nucleic acid (except AUG, which is ordinarily the only codon for methionine) can be modified to yield a functionally identical molecule by standard techniques. Accordingly, in each instance where mutagenesis is used each "silent mutation" of a nucleic acid, which encodes an amino acid, is implicity included.

Furthermore, one of ordinary skill will recognize that "conservative mutations" also include the substitution, deletion or addition of nucleic acids that alter, add or delete a single amino acid or a small number of amino acids in a coding sequence where the nucleic acid alterations result in the substitution of a chemically similar amino acid. Amino acids that may serve as conservative substitutions for each other include the following: Basic: Arginine (R), Lysine (K), Histidine (H); Acidic: Aspartic acid (D), Glutamic acid (E), Asparagine (N), Glutamine (Q); hydrophilic: Glycine (G), Alanine (A), Valine (V), Leucine (L), Isoleucine (I); Hydrophobic: Phenylalanine (F), Tyrosine (Y), Tryptophan (W); Sulfur-containing: Methionine (M), Cysteine (C). In addition, sequences that differ by conservative variations are generally homologous.

A "subsequence" refers to a sequence of nucleic acids or amino acids that comprise a part of a longer sequence of nucleic acids or amino acids (e.g., polypeptide) respectively.

A nucleic acid "operon" includes a gene that is situated in a functional relationship with other nucleic acid sequences, for example, a promoter, an enhancer, termination signals, or another gene if it increases the transcription of the coding sequence.

"Mutagenesis" as used herein includes such techniques known in the art as PCR mutagenesis, oligonucleotide-directed mutagenesis, site-directed mutagenesis, random mutagenesis, error-prone PCR mutagenesis, etc., and reiterative sequence recombination by any of the techniques described herein.

PCR primers for amplification of segments of the nucleic acid sequence of interest can be used to introduce variation into the gene of interest as follows. Mutations at sites of interest in a nucleic acid sequence are identified by screening or selection, by sequencing homologues of the nucleic acid sequence, and so on. Oligonucleotide PCR primers are then synthesized which encode wild type or mutant information at sites of interest. These primers are then used in PCR mutagenesis to generate libraries of full length genes encoding permutations of wild type and mutant information at the designated positions. This technique is typically advantageous in cases where the screening or selection process is expensive, cumbersome, or impractical relative to the cost of sequencing the genes of mutants of interest and synthesizing mutagenic oligonucleotides.

The term "isolated" nucleic acid molecule, as utilized herein, is one, which is separated from other nucleic acid molecules which are present in the natural source of the nucleic acid. Preferably, an "isolated" nucleic acid is free of sequences which naturally flank the nucleic acid (i.e., sequences located at the 5'- and 3'-termini of the nucleic acid) in the genomic DNA of the organism from which the nucleic acid is derived. Moreover, an "isolated" nucleic acid molecule, such as a cDNA molecule, can be substantially free of other cellular material or culture medium when produced by recombinant techniques, or of chemical precursors or other chemicals when chemically synthesized.

"Derivatives" are nucleic acid sequences or amino acid sequences formed from the native compounds either directly or by modification or partial substitution. "Analogs" are nucleic acid sequences or amino acid sequences that have a structure similar to, but not identical to, the native compound but differs from it in respect to certain components or side chains. Analogs may be synthetic or from a different evolutionary origin and may have a similar or opposite metabolic activity compared to wild type. "Homologs" are nucleic acid sequences or amino acid sequences of a particular gene that are derived from different species.

Derivatives and analogs may be full length or other than full length, if the derivative or analog contains a modified nucleic acid or amino acid, as described below. Derivatives or analogs of the nucleic acids or proteins of the invention include, but are not limited to, molecules comprising regions that are substantially homologous to the nucleic acids or proteins of the invention, in various embodiments, by at least about 70%, 80%, or 95% identity (with a preferred identity of 80-95%) over a nucleic acid or amino acid sequence of identical size or when compared to an aligned sequence in which the alignment is done by a computer homology program known in the art, or whose encoding nucleic acid is capable of hybridizing to the complement of a sequence encoding the aforementioned proteins under stringent, moderately stringent, or low stringent conditions. See e.g. Ausubel, et al., CURRENT PROTOCOLS IN MOLECULAR BIOLOGY, John Wiley & Sons, New York, N.Y., 1993, and below.

A "homologous nucleic acid sequence" or "homologous amino acid sequence," or variations thereof, refer to sequences characterized by a homology at the nucleotide level or amino acid level as discussed above. Homologous nucleotide sequences encode those sequences coding for isoforms of polypeptides. Isoforms can be expressed in different tissues of the same organism as a result of, for example, alternative splicing of RNA. Alternatively, isoforms can be encoded by different genes.

Nucleic Acids

The invention also contemplates a method for generating a nucleic acid that encodes a specific attractant activity. This exemplary method includes one or more of: isolating and cloning the gene for a native attractant peptide; recombining a nucleic acid encoding an attractant peptide with at least one other nucleic acid to create a library of attractant nucleic acids; transforming the recombinant attractant genes into a competent cell; screening the cells; isolating the desired nucleic acid for further cycles of recombination or expression; and screening attractant peptides for a desired activity. The method of this invention may also involve the construction of recombinant nucleic acids, plasmid vectors, or both, and the expression of genes in transformed host cells. The molecular cloning techniques required to achieve these goals are well known in the art.

Descriptions of the molecular biological techniques useful to the practice of the invention including mutagenesis, PCR, cloning, and the like include Berger and Kimmel, GUIDE TO MOLECULAR CLONING TECHNIQUES, METHODS IN ENZYMOLOGY, volume 152, Academic Press, Inc., San Diego, Calif. (Berger); Sambrook et al., MOLECULAR CLONING—A LABORATORY MANUAL (2nd Ed.), Vol. 1-3, Cold Spring Harbor Laboratory, Cold Spring Harbor, N.Y., 1989, and CURRENT PROTOCOLS IN MOLECULAR BIOLOGY, F. M. Ausubel et al., eds., Current Protocols, a joint venture between Greene Publishing Associates, Inc. and John Wiley & Sons, Inc.; Berger, Sambrook, and Ausubel, as well as Mullis et al., U.S. Pat. No. 4,683,202 (1987); PCR PROTOCOLS A GUIDE TO METHODS AND APPLICATIONS (Innis et al. eds), Academic Press, Inc., San Diego, Calif. (1990) (Innis); Lueng, et al., A method for random mutagenesis of a defined DNA segment using a modified polymerase chain reaction. Technique: J Methods Cell Molec Biol 1(1):11-15 (1989).

In some situations it is advantageous to use restriction enzyme sites in nucleic acids to direct the recombination of mutations in a nucleic acid sequence of interest. Preferably, the restriction endonucleases generate nonpalindromic sticky end overhangs that allow for efficient ordered reassembly with DNA ligase. Typically, restriction enzyme (or endonuclease) sites are identified by conventional restriction enzyme mapping techniques, by analysis of sequence information for that gene, or by introduction of desired restriction sites into a nucleic acid sequence by synthesis (i.e. by incorporation of silent mutations).

The nucleic acid molecules to be digested can be from replicated DNA, such as a plasmid preparation, or from PCR amplified nucleic acid fragments that contain the restriction enzyme recognition sites of interest. In the typical situation two homologous genes are digested with at least one restriction endonuclease, and the fragments are the rejoined by using a DNA ligase enzyme to restore the full length gene having shuffled regions. The number of regions to be shuffled will vary and depend also on the number of restriction enzymes used and the number of individual restriction recognition sites for each enzyme. The shuffled molecules can be introduced into cells as described and screened or selected for a desired property as described herein. Nucleic acid can then be isolated from pools (libraries), or clones having desired properties and subjected to the same procedure until a desired degree of improvement is obtained.

A nucleic acid can encode a mature polypeptide. The "mature" form arises, for example, as a result of one or more naturally occurring processing steps as they may take place within the cell, or host cell, in which the gene product arises. Examples of such processing steps leading to a "mature" form of a polypeptide or protein include the cleavage of the N-terminal methionine residue encoded by the initiation codon of an ORF, or the proteolytic cleavage of a signal peptide or leader sequence or from a step of post-translational modification other than a proteolytic cleavage event. Such additional processes include, for example, glycosylation, myristoylation or phosphorylation. In general, a mature polypeptide or protein may result from the operation of only one of these processes, or a combination of any of them.

Recombinant nucleic acids of the invention include oligonucleotides or nucleic acid molecules, e.g., an oligonucleotide which includes at least 6 contiguous nucleotides that encode the peptide of the invention. Many techniques for the cloning, subcloning, and transfer of recombinant nucleic acids into a plasmid vector or a host cell or both, and techniques for library screening and selection, are known in the art, and each of these formats and/or techniques is generally applicable to the present invention. For example, texts that disclose general techniques for manipulating nucleic acids of use in this invention include "Current Protocols in Molecular Biology" (Ausubel et al., eds., 1994)); Sambrook et al., "Molecular Cloning, A Laboratory Manual" (2nd ed. 1989); and Kriegler, "Gene Transfer and Expression: A Laboratory Manual" (1990), the contents and relevant teachings of which are hereby incorporated by reference.

In another embodiment, the present invention includes a method for selecting for recombinant nucleic acids that generate attractant peptides. This is accomplished by transforming a library of recombinant attractant nucleic acids into a population of organisms and subjecting the organisms to growth on a medium.

A nucleic acid molecule of the invention, can be isolated using standard molecular biology techniques. Using all or a portion of the nucleic acid sequence as a hybridization probe, molecules can be isolated using standard hybridization and cloning techniques (e.g., as described in Sambrook, et al., (eds.), MOLECULAR CLONING: A LABORATORY MANUAL 2.sup.nd Ed., Cold Spring Harbor Laboratory Press, Cold Spring Harbor, N.Y., 1989; and Ausubel, et al., (eds.), CURRENT PROTOCOLS IN MOLECULAR BIOLOGY, John Wiley & Sons, New York, N.Y., 1993.). A nucleic acid can be amplified using cDNA, mRNA or alternatively, genomic DNA, as a template and appropriate oligonucleotide primers according to standard PCR amplification techniques. The nucleic acid so amplified can be cloned into an appropriate vector and characterized by DNA sequence analysis. Furthermore, oligonucleotides corresponding to nucleotide sequences can be prepared by standard synthetic techniques, e.g., using an automated DNA synthesizer.

Polypeptides

Also contemplated by the invention are substantially purified polypeptides. In certain embodiments, the polypeptides include an amino acid sequence that is substantially identical to the amino acid sequence of a *Limulus polyphemus* polypeptide, fragments, homologs, analogs or derivatives thereof. Included in this aspect of the invention are synthetic peptides derived from *Limulus polyphemus*, as well as peptides generated from recombinant nucleic acids that are derived in whole or in part from open reading frames (ORFs), or genes of *Limulus polyphemus*. Also contemplated by the current invention are mutant peptides, mutant nucleic acids, alternative splice variants, and combinations threreof of *Limulus polyphemus* polypeptides.

One aspect of the invention pertains to isolated attractant polypeptides, and biologically-active portions thereof, or derivatives, fragments, analogs or homologs thereof. In one embodiment, native polypeptides can be isolated from cells or tissue sources by an appropriate purification scheme using standard protein purification techniques. In another embodiment, polypeptides are produced by recombinant DNA techniques. Alternative to recombinant expression, a polypeptide can be synthesized chemically using standard peptide synthesis techniques.

An "isolated" or "purified" polypeptide or protein or biologically-active portion thereof is substantially free of cellular material or other contaminating proteins from the cell or tissue source from which the protein is derived, or substantially free from chemical precursors or other chemicals when chemically synthesized. The language "substantially free of cellular material" includes preparations of proteins in which the protein is separated from cellular components of the cells from which it is isolated or recombinantly-produced. When the protein or biologically-active portion thereof is recombinantly-produced, it is also preferably substantially free of culture medium, i.e., culture medium represents less than about 20%, more preferably less than about 10%, and most preferably less than about 5% of the volume of the protein preparation.

Biologically-active portions of proteins include peptides comprising amino acid sequences sufficiently homologous to or derived from the amino acid sequences of the native protein that include fewer amino acids than the full-length proteins. Typically, biologically-active portions comprise a domain or motif with at least one activity of the native protein. A biologically-active portion of an NOVX protein can be a polypeptide which is, for example, 10, 25, 50, 100 or more amino acid residues in length. Moreover, other biologically-active portions, in which other regions of the protein are deleted, can be prepared by recombinant techniques and evaluated for one or more of the functional activities of a native protein.

Another aspect of the invention pertains to amino acid molecules encoding attractant polypeptides that contain changes or mutations in amino acid residues. In one aspect the polypeptides contain changes in amino acids that are not essential for activity. Such polypeptides differ in amino acid sequence from yet retain biological activity. In other aspects the polypeptides may contain sequence changes affect biological activity.

Mutations can be introduced into the polypeptide by standard techniques, such as site-directed mutagenesis and PCR-mediated mutagenesis. Preferably, conservative amino acid substitutions are made at one or more predicted, non-essential amino acid residues. A "conservative amino acid substitution." is one in which the amino acid residue is replaced with an amino acid residue having a similar side chain. Families of amino acid residues having similar side chains have been defined within the art. These families include amino acids with basic side chains (e.g., lysine, arginine, histidine), acidic side chains (e.g., aspartic acid, glutamic acid), uncharged polar side chains (e.g., glycine, asparagine, glutamine, serine, threonine, tyrosine, cysteine), nonpolar side chains (e.g., alanine, valine, leucine, isoleucine, proline, phenylalanine, methionine, tryptophan), beta-branched side chains (e.g., threonine, valine, isoleucine) and aromatic side chains (e.g., tyrosine, phenylalanine, tryptophan, histidine).

Chimeric and Fusion Proteins

The invention also provides chimeric or fusion proteins. As used herein, a "chimeric protein" or "fusion protein" comprises an attractant polypeptide operatively-linked to a non-attractant polypeptide. An "attractant polypeptide" refers to a polypeptide corresponding to a *Limulus polyphemus* peptide, whereas a "non-attractant polypeptide" refers to a polypeptide having an amino acid sequence corresponding to a protein that is not substantially homologous to a *Limulus polyphemus* protein, e.g., a protein that is different from the attractant protein and that is derived from the a different organism. Within an fusion protein the attractant polypeptide can correspond to all or a portion of the native protein. In one embodiment, a fusion protein comprises at least one biologically-active portion of a native attractant protein. Within the fusion protein, the term "operatively-linked" is intended to indicate that the attractant polypeptide and the non-attractant polypeptide are fused in-frame with one another. The non-attractant polypeptide can be fused to the N-terminus or C-terminus of the attractant polypeptide. Fusion proteins can be used to greatly facilitate the isolation and purification or the study of polypeptides. Examples of chimeric or fusion protein constructs that could be employed include, glutathione S-transferase (GST), His tag, heterologous signal sequences, fluorescent protein, immunoglobulin domains or the like.

An attractant polypeptide chimeric or fusion protein of the invention can be produced by standard recombinant DNA techniques. For example, DNA fragments coding for the different polypeptide sequences are ligated together in-frame in accordance with conventional techniques, e.g., by employing blunt-ended or stagger-ended termini for ligation, restriction enzyme digestion to provide for appropriate termini, filling-in of cohesive ends as appropriate, alkaline phosphatase treatment to avoid undesirable joining, and enzymatic ligation. In another embodiment, the fusion gene can be synthesized by conventional techniques including automated DNA synthesizers. Alternatively, PCR amplification of gene fragments can be carried out using anchor primers that give rise to complementary overhangs between two consecutive gene fragments that can subsequently be annealed and reamplified to generate a chimeric gene sequence (see, e.g., Ausubel, et al. (eds.) CURRENT PROTOCOLS IN MOLECULAR BIOLOGY, John Wiley & Sons, 1992). Moreover, many expression vectors are commercially available that already encode a fusion moiety (e.g., a GST polypeptide). An attractant polypeptide-encoding nucleic acid can be cloned into such an expression vector such that the fusion moiety is linked in-frame to the attractant protein. In addition, the attractant polypeptides can be used to generate libraries of peptides. These peptide libraries could consist of, for example, attractant peptides containing insertions, deletions, mutations, truncations, and any combination thereof.

Recombinant Expression Vectors and Host Cells

Another aspect of the invention pertains to vectors, preferably expression vectors, containing a nucleic acid encoding attractant protein, or derivatives, fragments, analogs or homologs thereof. As used herein, the term "vector" refers to a nucleic acid molecule capable of transporting another nucleic acid to which it has been linked. One type of vector is a "plasmid", which refers to a circular double stranded DNA loop into which additional DNA segments can be ligated. Another type of vector is a viral vector, wherein additional DNA segments can be ligated into the viral genome. Certain vectors are capable of directing the expression of genes to which they are operatively-linked. Such vectors are referred to herein as "expression vectors". In general, expression vectors of utility in recombinant DNA techniques are often in the form of plasmids. In the present specification, "plasmid" and "vector" can be used interchangeably as the plasmid is the most commonly used form of vector. However, the invention is intended to include such other forms of expression vectors, such as viral vectors (e.g., replication defective retroviruses, adenoviruses and adeno-associated viruses), which serve equivalent functions.

The recombinant expression vectors comprise an attractant nucleic acid in a form suitable for expression of the nucleic acid in a host cell, which means that the recombinant expression vectors include one or more regulatory sequences, selected on the basis of the host cells to be used for expression, that is operatively-linked to the nucleic acid sequence to be expressed. Within a recombinant expression vector, "operably-linked" is intended to mean that the nucleotide sequence of interest is linked to the regulatory sequence(s) in a manner that allows for expression of the nucleotide sequence (e.g., in an in vitro transcription/translation system or in a host cell when the vector is introduced into the host cell). The recombinant expression vectors of the invention can be designed for expression of proteins in prokaryotic or eukaryotic cells.

Vector DNA can be introduced into prokaryotic or eukaryotic cells via conventional transformation or transfection techniques. As used herein, the terms "transformation" and "transfection" are intended to refer to a variety of art-recognized techniques for introducing foreign nucleic acid (e.g., DNA) into a host cell, including calcium phosphate or calcium chloride co-precipitation, DEAE-dextran-mediated transfection, lipofection, or electroporation. Suitable methods for transforming or transfecting host cells can be found in Sambrook, et al. (MOLECULAR CLONING: A LABORATORY MANUAL. 2nd ed., Cold Spring Harbor Laboratory, Cold Spring Harbor Laboratory Press, Cold Spring Harbor, N.Y., 1989), and other laboratory manuals.

A host cell of the invention, such as a prokaryotic or eukaryotic host cell in culture, can be used to produce (i.e., express) attractant protein. Accordingly, the invention further contemplates methods for producing attractant protein using host cells. In one aspect, this includes culturing the host cells (into which a recombinant expression vector encoding the attractant protein has been introduced) in a suitable medium such that attractant protein is produced. In another embodiment, the method further comprises isolating the attractant protein from the medium or the host cell.

Synthetic Peptides

Synthetic horseshoe crab attractant peptides can be created by any suitable means commonly understood by those of ordinary skill in the art, and are readily available from commercial producers. As is known in the art, peptides can be synthesized using solid phase, or solution phase synthesis techniques, and synthesized from the C-terminus to the N-terminus of the sequence.

One benefit of generating a synthetic horseshoe crab attracant peptides is that a wide variety of modifications can be easily added. Examples of peptide modifications that can be utilized include, the addition of: Biotin, Fluorescein, Phosphorylation (tyrosine, serine, threonine), N-acetylation, C-amidation, (These modifications protect the peptide from degradation. They also make the peptide more closely mimic the charge state of the alpha amino and carboxyl groups in the native protein.); D-amino acids, MAPs, KLH/BSA conjugation, cyclization and more. Another benefit of generating synthetic peptides is that the product is already substantially pure and free of possible cellular debris or contamination. For example, synthetic peptides are available as a lyophilized powder that can be resuspended in any suitable buffer, at any desired concentration or used directly for incorporation into a capsule, or used as a food additive or the like. Importantly however, there does exist some limitations on the size of the peptide which is capable of being synthesized. Therefore, recombinant methods of protein production are preferred for longer peptides (e.g. over about 70 amino acids).

The following references discuss methods of peptide synthesis and are incorporated herein by reference in their entirety; P. Rovero, et. al., Fmoc vs. tBOC (1991) Int. J. Peptide Protein Res., 37 140; Smith et. al. In Techniques in Protein Chemistry III, Academic Press, R. Angeletti (Ed.). 1992, p. 219; Corradin G, Spertini F, Verdini, Medicinal application of long synthetic peptide technology. Expert Opin Biol Ther. 2004 October; 4(10):1629-39; Vandermeulen GW, Klok HA., Peptide/protein hybrid materials: enhanced control of structure and improved performance through conjugation of biological and synthetic polymers. Macromol Biosci. 2004 Apr. 19;4(4):383-98; Sidney P., Ed Colowick, Methods in Enzymology, Vol. 30: Nucleic Acids and Protein Synthesis, Pt. F, Academic Press (1974); Robin Martin, Protein Synthesis: Methods and Protocols, Humana Press; 1st edition (Sep. 15, 1998).

Kits

Also disclosed according to the present invention is a kit or system utilizing any one of the selection strategies, materials, components, methods or substrates hereinbefore described. Exemplary kits according to the present disclosure will optionally additionally include instructions for performing methods or assays, packaging materials, one or more containers which contain assay, device or system components, or the like. Kits of the present invention may be employed in diagnostic and/or screening assays.

In other embodiments the horseshoe crab attractant polypeptide may be incorporated with other active or inactive ingredients or excipients or carriers for delivery, administration or use. The excipients may include, for example, salts, lipids, emulsifiers, solubilizers, fats, oils, phospholipids, minerals, plant extracts, carbohydrates, protein carriers, and the like. As will be appreciated by one of ordinary skill in the art, the attractant polypeptide may be incorporated into any suitable form, for example, a capsule, a tablet, a powder, a liquid, a gel, a food additive, and the like.

Bait Formulations

The horseshoe crab extract or attractant can be placed into a standard bait formulation. Many bait formulations are known in the art, and include, for example, those disclosed in U.S. Pat. Nos. 4,731,247 and 4,463,018, incorporated herein by reference.

An effective bait should incorporate an effective amount of horseshoe crab extract or attractant, whereby the bait is effective in attracting aquatic organisms, preferably over a long period of time. Those having skill in the art can determined how much of the attractant or extract is an effective amount.

The horseshoe crab extract or attractant can be combined with one or more other known attractants. In addition, various other materials, such as preservatives, stabilizers, flow enhancers and coloring agents can be combined with the extract or attractant to provide a more effective bait product. Preservatives, stabilizers and mixtures thereof are effective in preventing growth of biological species that may lead to spoilage.

While the present invention is directed specifically to use in attracting eel and conch, horseshoe crabs are also known to be effective attractants for lobster and catfish, and, as such, the attractant of the present invention is also directed to these and other aquatic animals.

The invention also provides a composition and method of preparing an artificial bait for marine animals. The method comprises incorporating or enclosing a functionally effective amount of the attractant derived from a horseshoe crab egg protein in a material or container capable of releasing the attractant when immersed in a marine environment. Also contemplated is a composition and method comprising mixing a functionally effective amount of the attractant derived from a horseshoe crab egg protein with a carrier or excipient agent or both, allowing for the release of the attractant when immersed in a marine environment.

The invention also provides a method of attracting marine animals wherein said method comprises employing a bait containing an attractant derived from a horseshoe crab egg protein as an attractant in a trap for marine animals and immersing the trap in a marine environment, whereby a functionally effective amount of the attractant is released into the marine environment.

The term "trap" as used herein is intended to mean, by way of nonlimiting example, all potential ways of catching marine animals. Thus, a trap can be, for example, a trot line, a weir, a cage, a net, a mesh container, or a hook.

The invention can be better understood by reference to the following examples which are intended to illustrate, not limit, the present invention.

EXAMPLES

Example 1

Egg Collection

Horseshoe crabs eggs were collected on various beaches along the southern half of the Delaware Bay in May and June from 1998-2003 during horseshoe crab spawning events. Clutches of eggs were removed from nests approximately one hour after high tide, placed into 50 ml centrifuge tubes and put on ice during transport back to the College of Marine Studies in Lewes, Del. where they were placed in an ultralow freezer (Harris Ultralow Freezer) at −80° C. Eggs were thawed at room temperature prior to use.

Extract Preparation

Horseshoe crab eggs were thawed, ground with a mortar and pestle then extracted in a 50 mM Tris buffer, pH 7.5, in a 1:2 ratio overnight at 4° C. Extract was then removed from the cold and filtered through cheesecloth. To remove particles, sand and cellular debris, extract was spun on a tabletop centrifuge (Fisher Benchtop Centrific Centrifuge) for 10 min at 8000 rpm. Extract was immediately heated at 95° C. for 5 min. Following heat exposure, the extract was spun at 10,000 g in a Sorvall RC-5B centrifuge for 30 min at 4° C. (FIG. 1). Extract was divided into aliquots and stored at −20° C. until used. Tests on samples stored at −20° C. for as long as three months suggested that activity was retained over that time period. However, these tests were not systematic, so samples were discarded if not used after approximately 14 days at −20° C. Where noted, EDTA-Free Protease Inhibitor Cocktail (Roche Diagnostics #1873590) was added to the Tris buffer before the eggs were added. One tablet was added for every 50 ml of egg extract.

Example 2

Snail Bioassays

Mud snails, *Ilyanassa obsoleta*, were used in bioassays to follow activity through different chemical fractions of horseshoe crab extract (as described in the detailed description above, unless otherwise noted, the term "horseshoe crab extract" shall mean the horseshoe crab extract of purity in supernatant B of Example 1). An advantage of this test for the experimental design is that it takes into account snails that do not make a choice (i.e., they respond to neither the treatment nor the control solution, but rather remain in the starting area). Over 10,000 randomization iterations were run on Monte Carlo software (Resampling Stats, Resampling Stats, Inc.). The simulations indicated that if the average number of snails choosing a stimulant was greater or equal to 6.5, the result was not random ($P \leq 0.01$).

Figure 2:
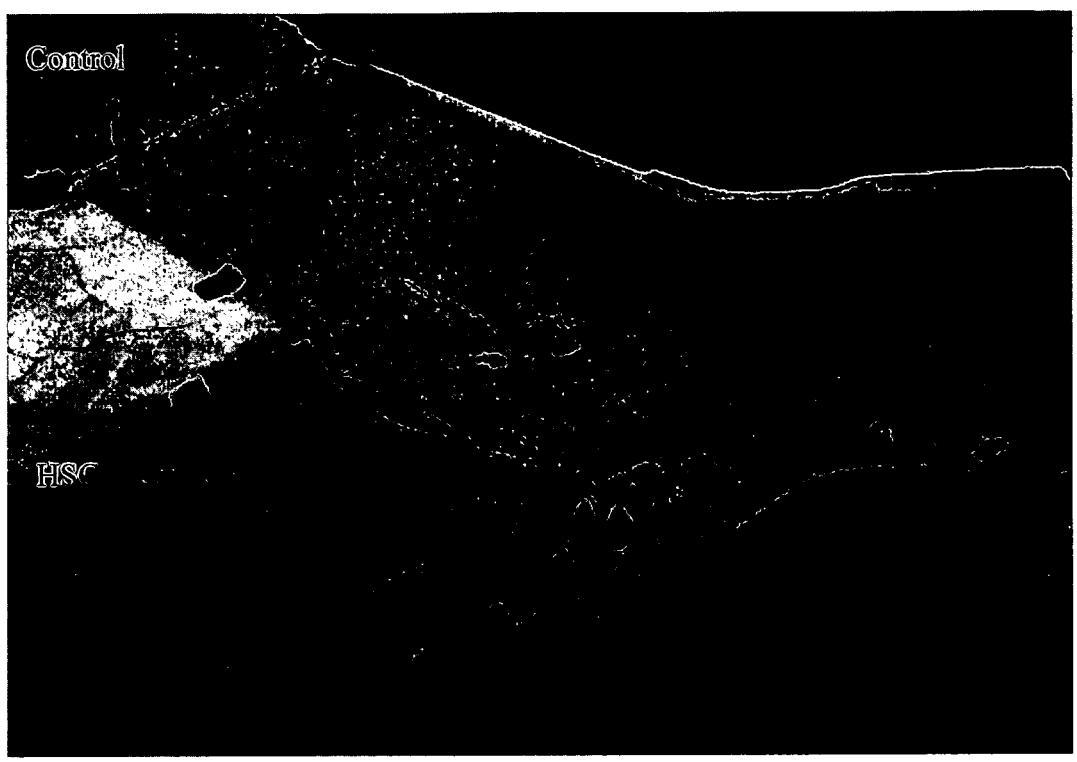
FIG. 2 is a photograph of a Y-tube snail assay using *Ilyanassa obsoleta*.

Snails were collected from Cape Henlopen State Park in Lewes, Del. (38.8° N, 75.1° W) and maintained in aquaria with ambient seawater from the Delaware Bay that was changed every other day. The snails were fed a mixed diet of squid, silversides, mussels, oysters and spinach. For bioassays (as reported in Ferrari and Targett 2003 and incorporated herein by reference), ten snails were selected haphazardly and placed in a Y-choice chamber (diameter=21.5 cm, arm length=70 cm) for ten minutes (FIG. 2). A peristaltic pump (Masterflex C/L pump) delivered a treatment solution into one side of the chamber and a control solution into the opposite side (8 ml/min). Extract tested was diluted into 1 L of seawater. Control solution, was Tris buffer (pH 7.5) diluted into 1 L of seawater in amounts equal to the treatment solution. The typical concentration of extract used was 3 ml of horseshoe crab egg extract diluted in 1 L of seawater. Later experiments used concentrations of 30 to 100 µl of horseshoe crab extract diluted into 1 L of seawater. Snail response was recorded as movement towards either side of the Y-choice chamber, or movement in neither direction (i.e. they remained in the starting area). Eight replicates of ten snails each were run for every sample tested. The Y-tube was scrubbed and rinsed with fresh seawater in between each run. Snails were starved for 24 h prior to use and were used only once. Results were analyzed with Monte Carlo Randomization Simulations (Resampling Stats, Resampling Stats, Inc. Manly 1991). Results, reported as means±standard error, were significant when the average number of snails responding was greater than or equal to 6.5.

Figure 3:
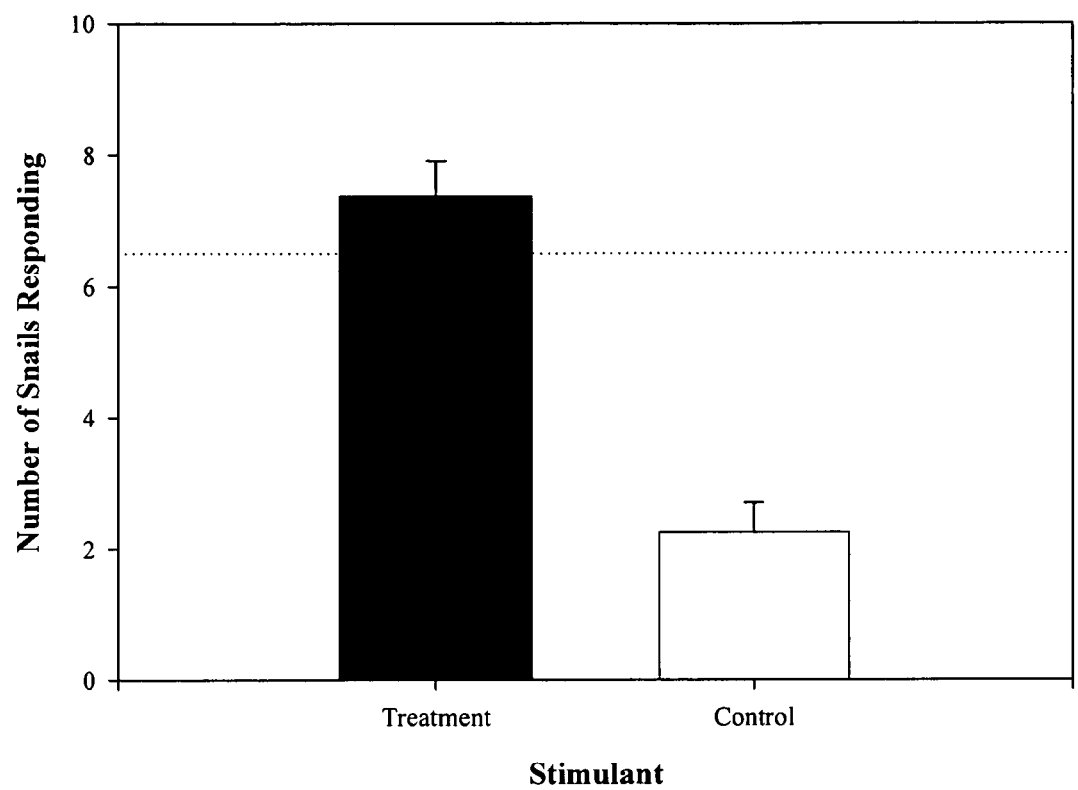
FIG. 3 is a bar graph depicting the response of *Ilyanassa obsoleta* to the horseshoe crab extract in the Y-choice assay.
Figure 4:
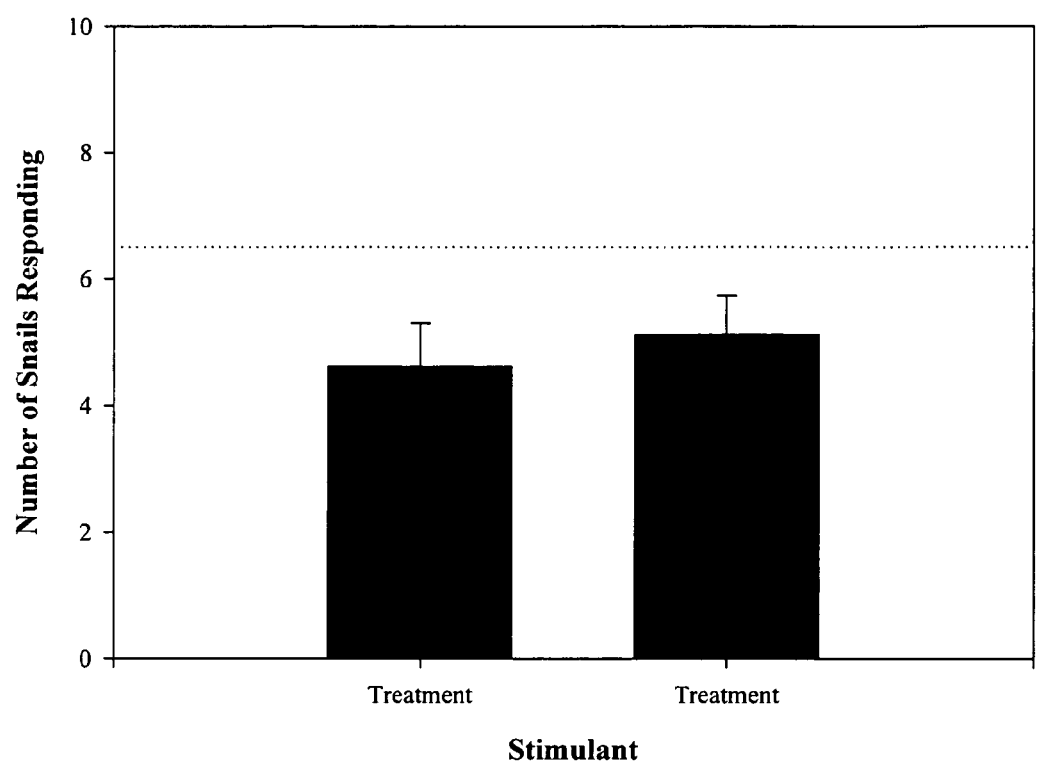
FIG. 4 is a bar graph depicting the response of *Ilyanassa obsoleta* to the horseshoe crab extract delivered from both sides of the Y-tube.
Figure 5:
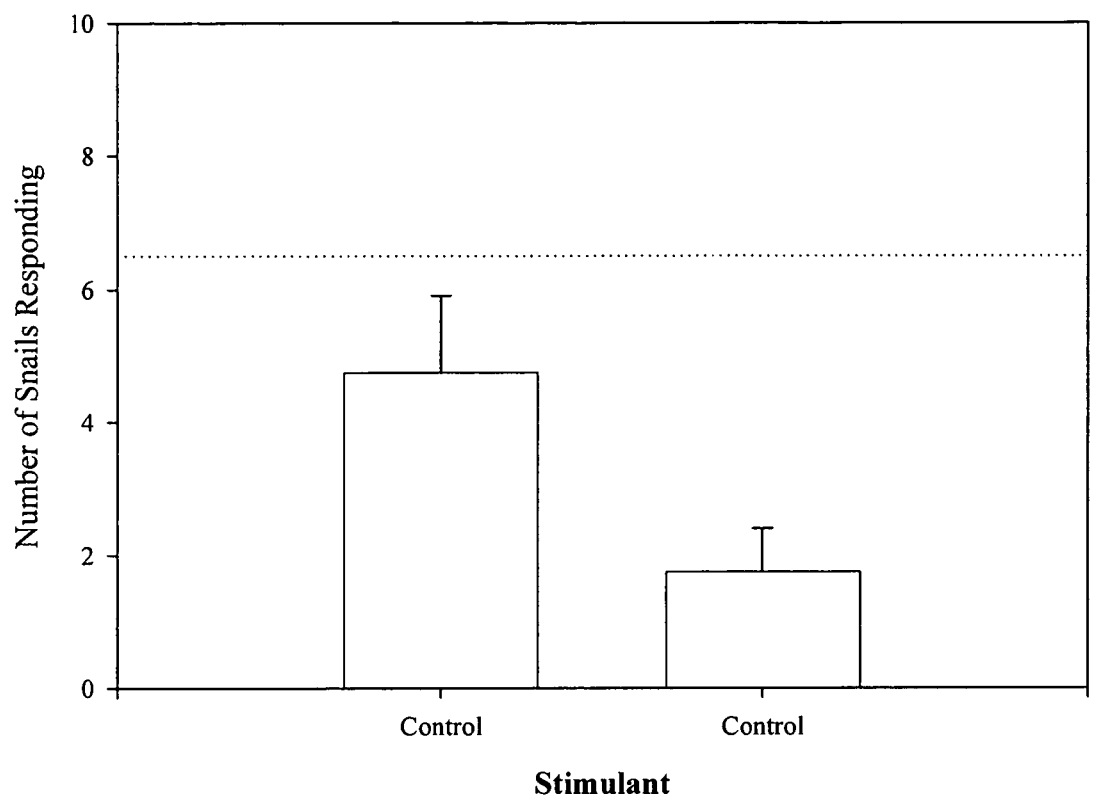
FIG. 5 is a bar graph depicting the response of *Ilyanassa obsoleta* to control versus control in the Y-choice assay.

Baseline assays indicated that a directional bias inherent in the snails did not affect the result of the snail bioassays. When presented with Supernatant B FIG. 1 from horseshoe crab eggs and a control of seawater with Tris-HCl buffer, *Ilyanassa obsoleta* were significantly attracted to the extract (Supernatant B, FIG. 1), or treatment solution (FIG. 3). When both solutions delivered into the Y-choice tube were supernatant B from *L. polyphemus* eggs, snails demonstrated no statistically significant preference for either solution (FIG. 4). Similarly, when *Ilyanassa* were placed into the Y-choice tube and presented with a solution of seawater and buffer, the standard control solution, from both sides, no detectable difference was found (FIG. 5) indicating that the chemical attractant in *Limulus* eggs elicits a strong response from *I. obsoleta* independent of their known directional tendencies and trail following behavior.

Example 3

Effective Concentration of Horseshoe Crab Extract

Figure 6:
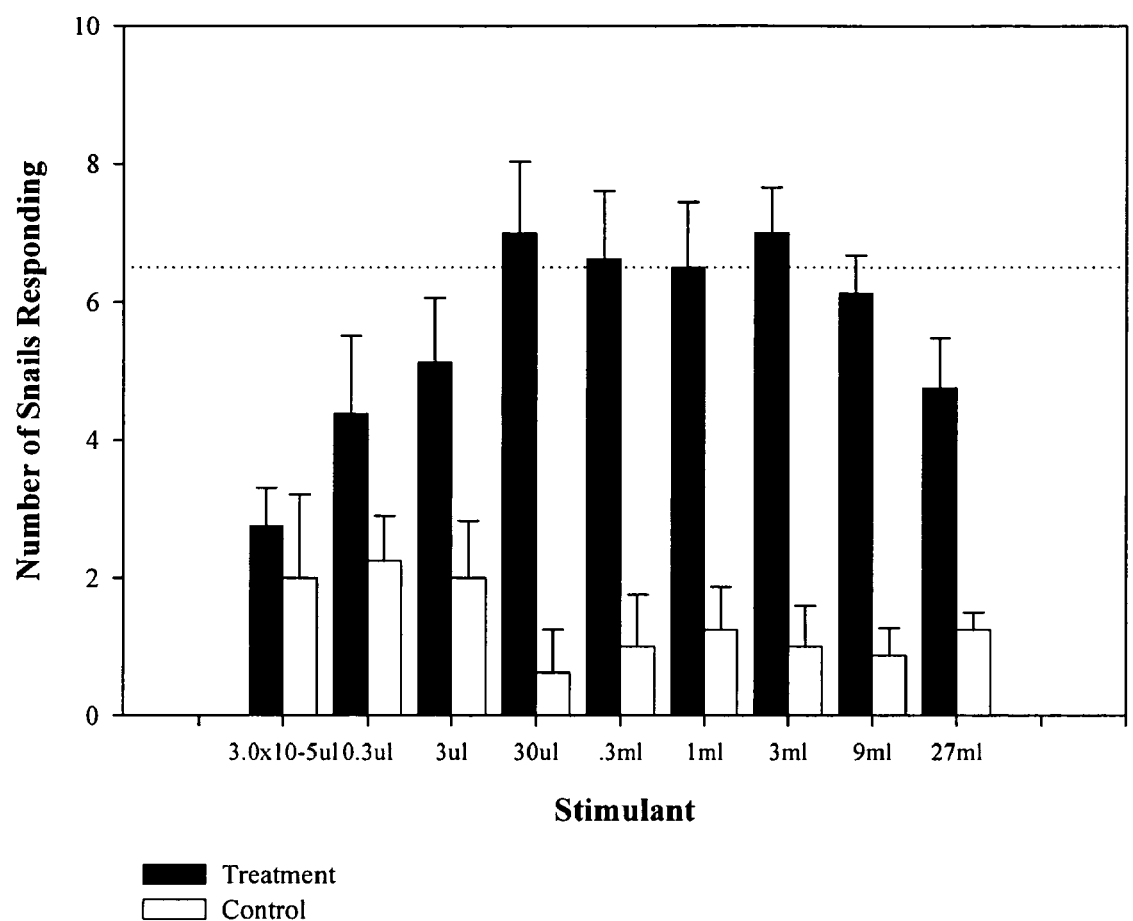
FIG. 6 is a bar graph depicting the snail response to a range of concentrations of the horseshoe crab extract in the Y-choice assay.

Aquatic organisms typically respond to a range of concentrations of a particular stimulant. In order to ascertain the range of concentrations of horseshoe crab extract that are attractive to *Ilyanassa obsoleta*, a range of volumes of extract prepared from horseshoe crab eggs were added to 1 L of seawater and presented in Y-choice assays in order to determine their threshold levels. Concentrations ranging from $3.0 \times 10^{-5}$ µl to 27 ml, were tested in bioassays with *Ilyanassa obsoleta*, producing a response curve typical of detection thresholds (FIG. 6).

Example 4

Dialysis to Determine Size of Attractant

Three sizes of dialysis tubing were used to ascertain the molecular size of the attractant. Spectra/Por dialysis tubing (molecular weight cut offs 1 kDa, 10 kDa and 50 kDa) (Spectrum Laboratories, Inc., Spectra/Por membrane 7 #132103, 132117, and 132128) was filled with either 3 ml or 100 µl of horseshoe crab extract (as prepared in Example) and the indicated amount of Tris buffer and placed in 1 L of autoclaved (to remove bacteria) seawater, covered with aluminum foil and placed at 4° C. for 16.7 h. Following the treatment period, the bag was removed from the liter of seawater and the solution remaining on the inside of the dialysis bag was diluted into 1 L of seawater and assayed for activity in snail bioassays. The solution remaining outside of the dialysis bag also was assayed for activity in snail bioassays. Tris buffer diluted into 1 L of seawater served as the control for the bioassays.

Figure 7:
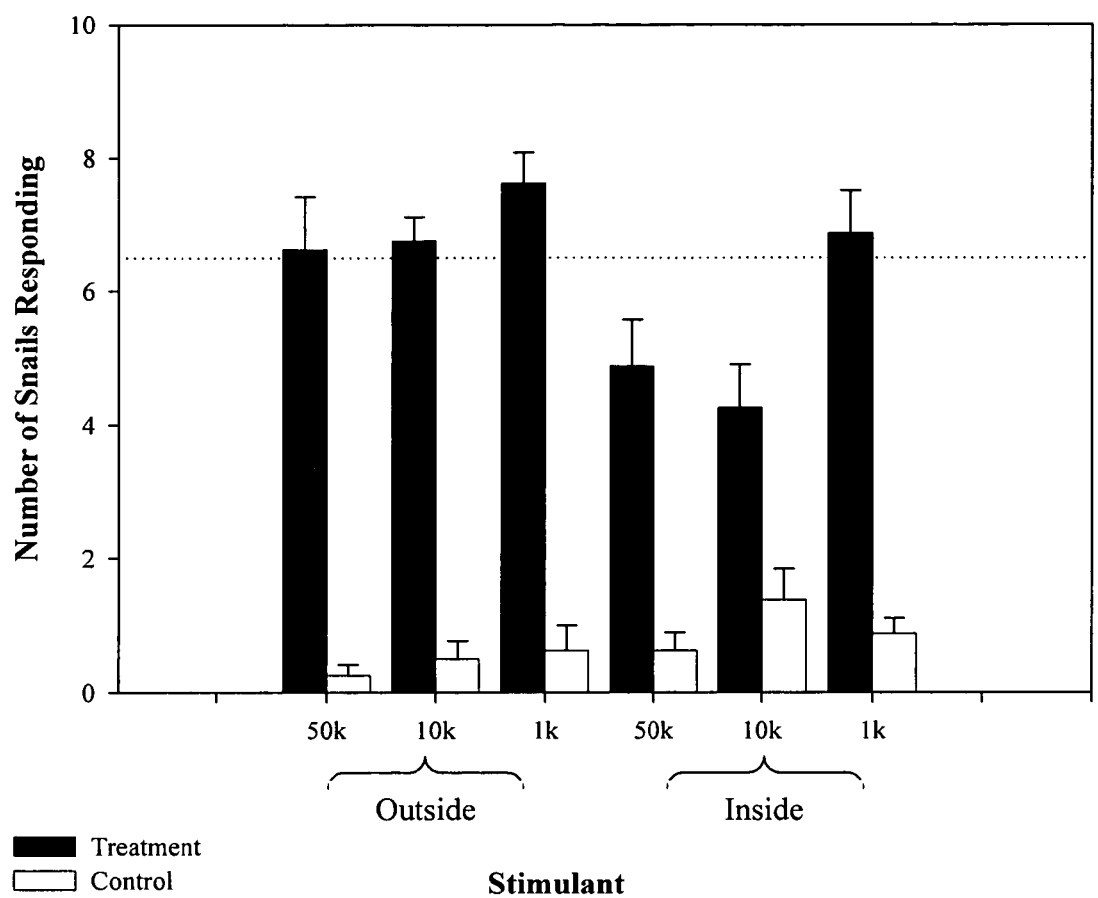
FIG. 7 is a bar graph depicting the snail response to preparations of horseshoe crab extract obtained from dialysis at several molecular weight cutoffs.
Figure 8:
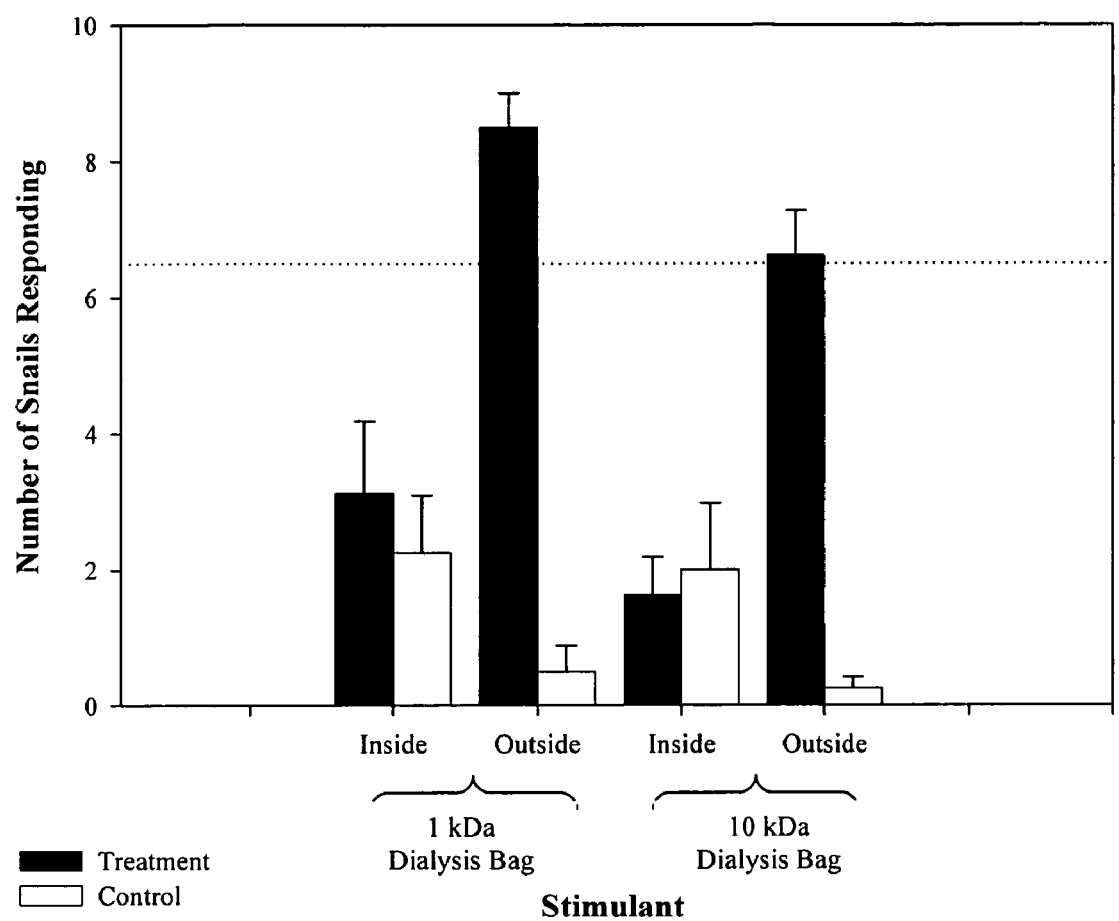
FIG. 8 is a bar graph depicting the snail response to 1 kDa and 10 kDa sizes of horseshoe crab extract obtained from dialysis.

When the solution remaining outside of the dialysis bag was tested in snail bioassays, a statistically significant result was obtained in all three dialysis bag sizes, (1 kDa, 10 kDa, and 50 kDa). Similarly, the solution remaining inside of the 1 kDa dialysis bag also elicited a significant response from *Ilyanassa*. The solution remaining inside of the 10 kDa and 50 kDa dialysis bags, however, was not attractive to the snails when tested in Y-choice assays (FIG. 7). When smaller amounts of extract were used in the dialysis bags (i.e., 30 μl and 100 μl) results were not as consistent. When using 30 μl of extract in a 10 kDa dialysis bag, neither the solution remaining inside or outside of the dialysis bag elicited a significant response from *I. obsoleta*, likely because the amount of the attractant was lower than their threshold level of detection. By increasing the volume of supernatant B to 100 μl, a significant response to the solution remaining outside of the bag was consistently obtained; response, however, to the solution remaining inside of the dialysis bag varied between assays (FIGS. 7 and 8).

As a result of the dialysis experiments, there is strong evidence that the horseshoe crab attractant is approximately about 1 kDa in size. It appears to be this size as the solution remaining in the 1 kDa dialysis bag, that is, compounds greater than 1 kDa in molecular weight, elicited a significant response, whereas the solution outside the bag did not attract *I. obsoleta*.

Example 5

Enzmme Treatment to Determine Type of Molecule

Horseshoe crab extract (as prepared in Example 1) was incubated with four different enzymes to further investigate the type of molecule that was functioning as the attractant (see Table 1 below).

TABLE 1

Description of enzymes used in enzyme exposure experiments. Optimum pH and temperature indicate the values at which optimal enzyme activity is observed. Experimental pH and temperature are values of those parameters used in the present experiments.

| Enzyme | Optimum pH | Optimum °C. | Experimental pH | Experimental °C. | Enzyme Function |
|---|---|---|---|---|---|
| proteinase K (Invitrogen 25530-049) | 6.5-9.5 | 65 | 7.5 | 37 or 24.1 | Serine protease that cleaves peptides bonds mainly following the carboxyl group of N-substituted hydrophobic aliphatic and aromatic amino acids |
| N-glycosidase-F (Calbiochem 362185) | 7.5 | 37 | 7.5 | 37 | catalyzes release of asparagines-linked high mannose, hybrid and complex oligosaccharides from glycoproteins |
| carboxy-peptidase A (Sigma C0261) | 7.5 | 25 | 7.5 | 24.1 | cleaves the C-terminal amino acid, but not usually -Asp, -Glu, -Arg, -Lys or -Pro |
| carboxy-peptidase B (Roche 103233) | 7.0-9.0 | 25 | 7.5 | 24.1 | cleaves basic amino acids arginine and lysine from carboxyl terminal |

Proteinase K (Invitrogen RNA grade proteinase K solution Cat. No. 25530-049, concentration ≧20 units/mg) incubations were performed to determine if the attractant was a protein or a peptide. 3.5 ml of extract were incubated for 2, 18 or 36 h at 37° C. with 35 μl of 500 mM $CaCl_2$ and 10 μl of proteinase K. The control solution was identical except there was no addition of the enzyme. N-Glycosidase-F (Calbiochem N-glycosidase-F *Chryseobacterium meningosepticum* 100 units Cat. No. 362185, concentration 5 units/μl) was used to determine if the attractant had a sugar component that may be acting synergistically with the protein or peptide constituent. 10 μl of enzyme was added to 3 ml of extract and placed in 37° C. for 18 or 36 h; digests were tested for activity in snail bioassays. The control solution was identical except for the addition of enzyme. Egg extract was also incubated with carboxypeptidase A (Sigma C-0261 from bovine pancreas, concentration 25 units/μl) to examine the effects on activity of cleaving the peptide bond at the terminal carboxyl group. For every milliliter of horseshoe crab extract, 0.4 μl of enzyme was added per Rittschof et al. (1984). Horseshoe crab extract without enzyme served as the control. Incubation occurred at room temperature for either 2 or 18 h. One experiment added 1.2 μl of carboxypeptidase A to 1.5 ml of horseshoe crab extract for 36 h. In all cases, 100 μl of the treatment and control solutions were diluted into 1 L of seawater and tested for activity in snail bioassays. Carboxypeptidase B (Roche 103233, concentration 5 mg/ml) was used to determine if the attractant has either an arginine or lysine at the carboxyl terminal. Three milliliters of horseshoe crab extract were incubated with 1.2 μl of carboxypeptidase B for 18 h at room temperature. An additional carboxypeptidase B experiment incubated 1 ml of horseshoe crab extract with 12 μl of carboxypeptidase B for 18 h at room temperature.

Figure 9:
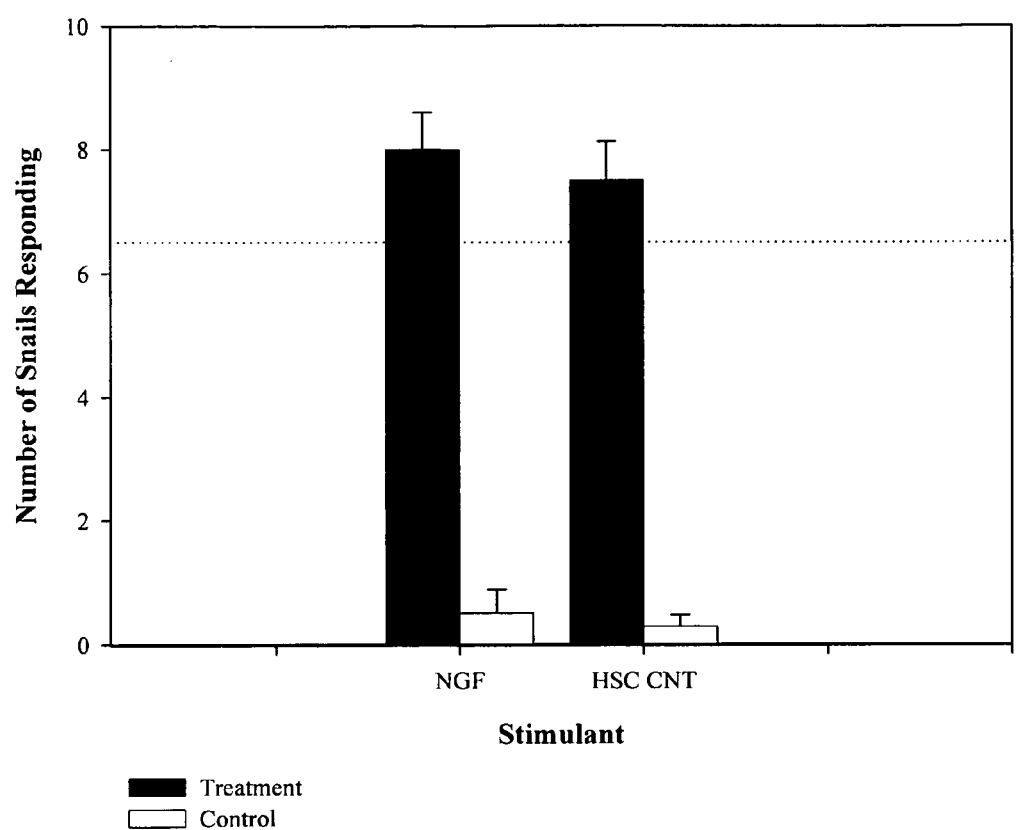
FIG. 9 is a bar graph depicting the snail response to horseshoe crab extract treated with N-glycosidase-F.
Figure 10:
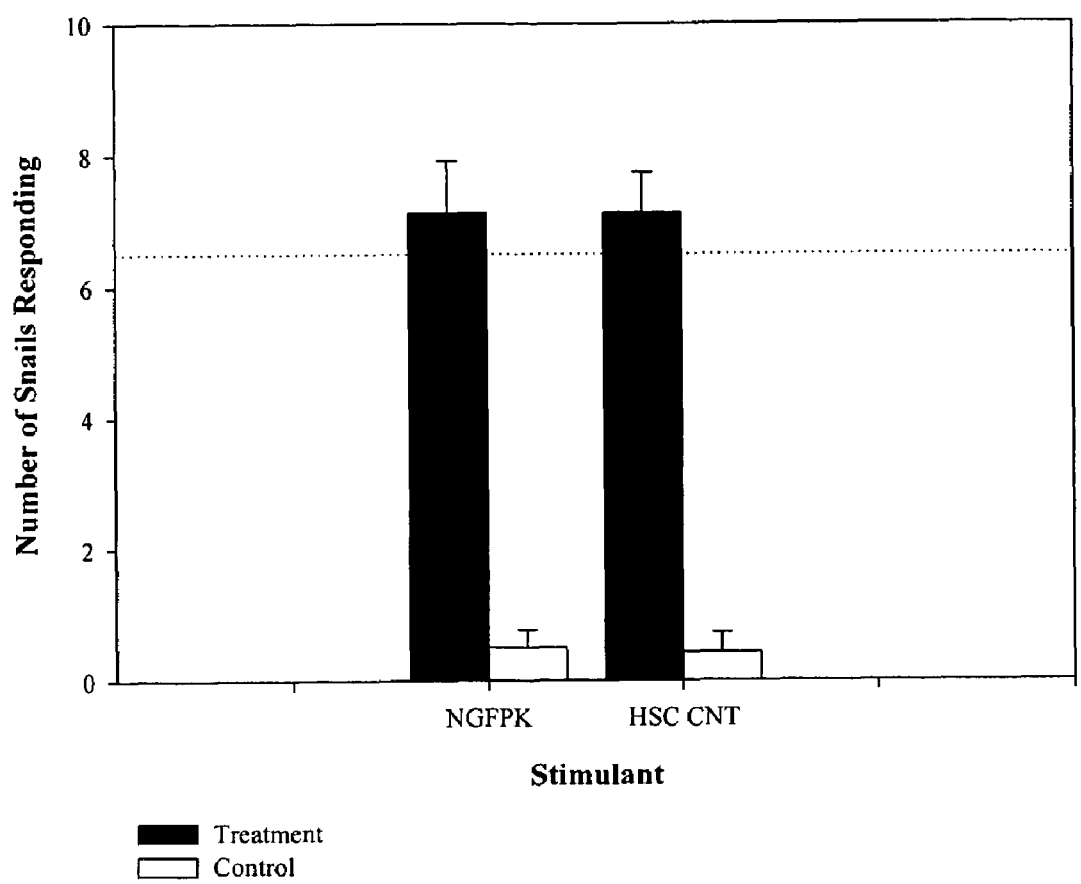
FIG. 10 is a bar graph depicting the snail response to horseshoe crab extract treated with N-glycosidase-F and proteinase K.

Incubating extract from the eggs of *Limulus polyphemus* with N-glycosidase-F did not change the response of *Ilyanassa* to horseshoe crab extract (FIG. 9). Incubation of 3 ml of horseshoe crab extract with 10 μl of N-glycosidase-F for 18 or 36 h failed to decrease activity in assays with *I. obsoleta*. Both the enzyme treated extract and the horseshoe crab extract control elicited significant responses from mud snails. When extract was incubated with the enzyme for 18 h and then proteinase K was added for an additional 18 h, no difference between the horseshoe crab extract treated with the enzymes and the control extract was seen (FIG. 10); the number of snails responding to both the control and treatment solutions was statistically significant.

Figure 11:
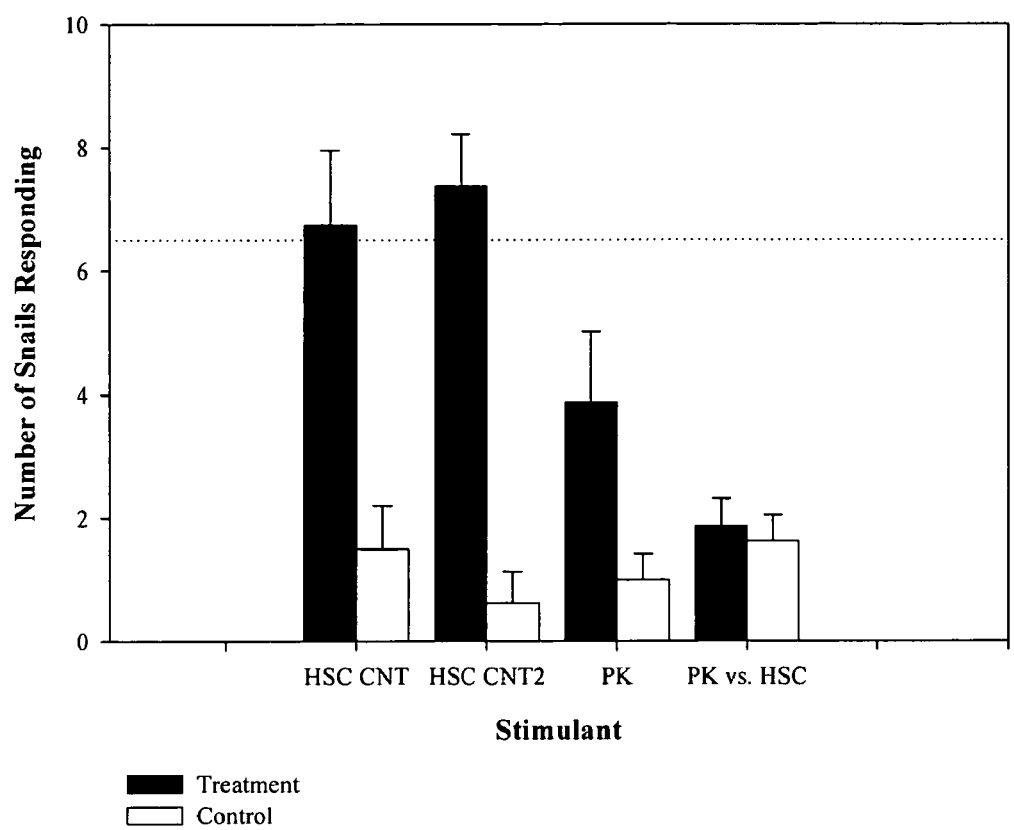
FIG. 11 is a bar graph depicting the snail response to horseshoe crab extract incubated with proteinase K for 18 hours.

The addition of proteinase K to extract from *Limulus* eggs produced variable results depending on the concentration of extract tested with the snails and conditions of the experiment. Initially, enzyme was added to the extract for 2 hours. When tested, both the treatment (extract incubated with proteinase K) and the control (extract without enzyme) elicited a statistically significant response from *Ilyanassa*. Using 30 μl of horseshoe crab extract that had been incubated with proteinase K for 18 hours in bioassays, snails found the control solution significantly attractive, while the treatment solution was not attractive at the statistically significant level (FIG. 11). These results were repeatable. Control assays were run with proteinase K to rule out an effect of the enzyme. The treatment for this assay was proteinase K in 1 L of seawater, while the control was seawater.

Figure 12:
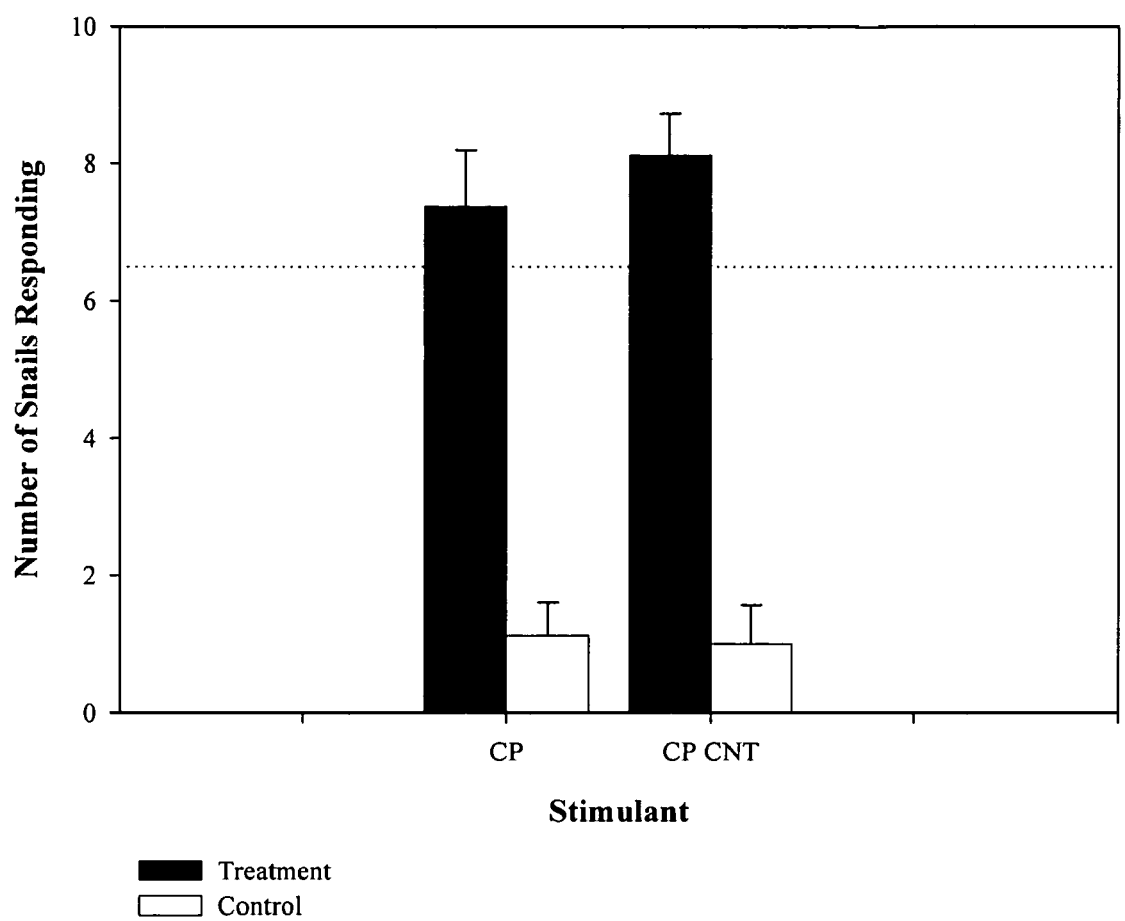
FIG. 12 is a bar graph depicting the snail response to horseshoe crab extract incubated with carboxypeptidase A for 36 hours.

In contrast to the horseshoe crab extract that had been incubated with proteinase K, there was no impact when extract was incubated with carboxypeptidase A. When extract from *Limulus* eggs was combined with 1.2 μl of carboxypeptidase A for 2 h, no degradation of the attractant was discernible from the behavior of the snails as it elicited a significant response. Extract remained active when the incubation time was increased to 18 h. Further increasing the incubation time of the egg extract with the carboxypeptidase A to 36 h produced similar results, even though the amount of extract incubated with 1.2 µl of enzyme was decreased to 1.5 ml (FIG. 12).

Figure 13:
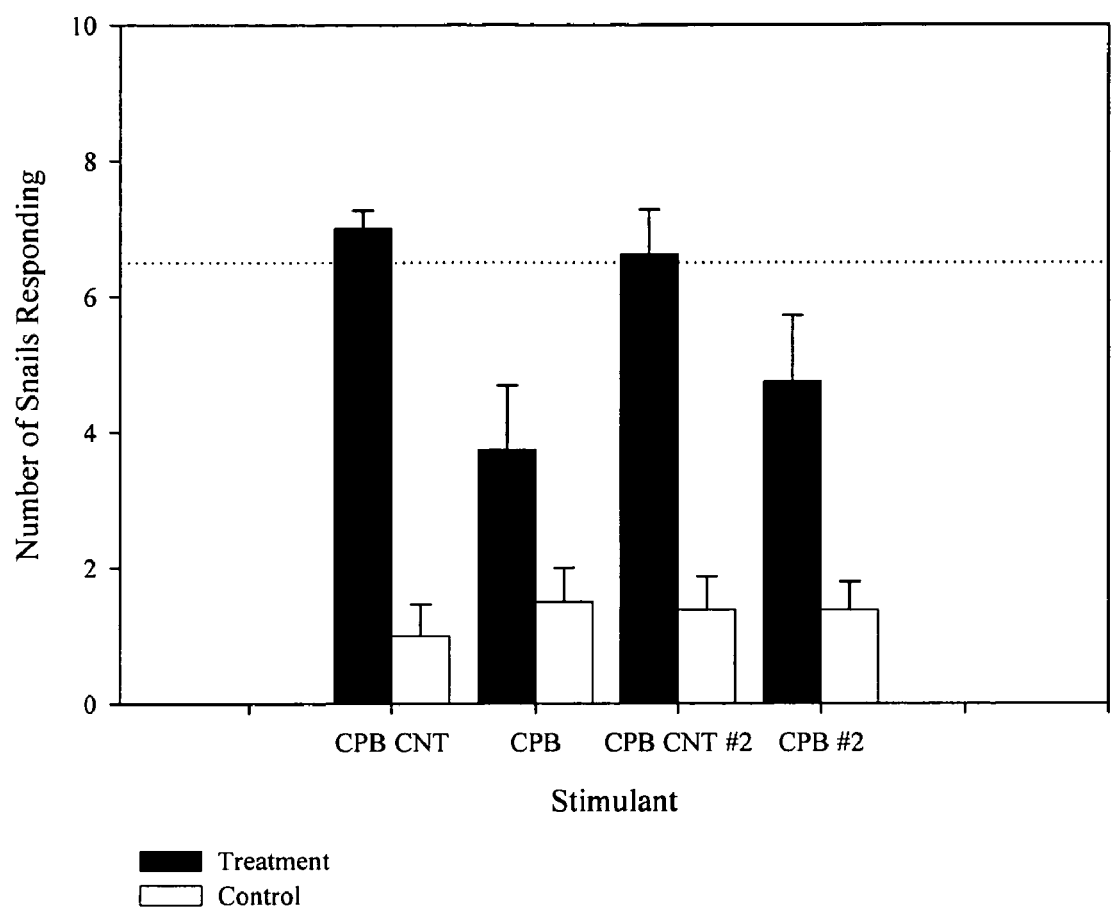
FIG. 13 is a bar graph depicting the snail response to horseshoe crab extract incubated with carboxypeptidase B.

While there was no difference in the response of *Ilyanassa obsoleta* to extract that had been incubated with carboxypeptidase A, snail response to extract incubated with carboxypeptidase B was significantly different from their response to control extracts. When horseshoe crab extract was incubated with 12 µl of carboxypeptidase B for 18 h, activity was lost and *I. obsoleta* did not demonstrate an attraction to the extract (FIG. 13).

Protein contents were estimated for solution remaining inside of dialysis bags and extract used in enzyme experiments both before and after incubation with enzymes (see Table 2 below).

TABLE 2

Protein contents of various samples. Protein contents as determined by the Bradford Method. Each group (separated by spaces in table) of samples is from the same hatch of extract.

| Sample | SNAIL ASSAY RESULT | Protein Content (mg/ml) |
| --- | --- | --- |
| Crude extract filtered through cheesecloth* (14 µl) | Significant | 22.6 |
| Supernatant A* (5 µl) | Significant | 6.8 |
| Supernatant B | Significant | 1.6 |
| Proteinase K 18 h | Not Significant | 0.6 |
| Proteinase K 18 h control (not treated with enzyme) | Significant | 1.5 |
| Dialysis bag 1k, inside | Not Significant | 0.3 |
| Dialysis bag 10k, inside | Not Significant | 0.6 |
| Supernatant B | Significant | 1.4 |
| CPA** 2 h | Significant | 1.5 |
| CPA 2 h Control | Significant | 1.5 |
| CPA 18 h | Significant | 1.7 |
| CPA 18 h Control | Significant | 1.6 |
| CPA 36 h | Significant | 1.6 |
| CPA 36 h Control | Significant | 1.4 |
| Superntent B | Significant | 0.9 |
| CPB*** 18 h | Not Significant | 0.8 |
| CPB 18 h Control | Significant | 1.0 |

*Measurement day one. Amounts used in parentheses (see methods section for explanation).
**CPA = carboxypeptidase A
***CPB = carboxypeptidase B Comparison of the untreated extract with extract that had been treated with proteinase K demonstrates that protein content is decreasing regardless of whether the same samples elicited a significant result in bioassays with *Ilyanassa*. The same response is not seen with carboxypeptidase A demonstrating little if any protein degradation in all samples, control and treatment alike. Additionally, the solutions remaining inside of the dialysis bags have decreased protein contents relative to the extract prepared for the experiment. Protein contents of extract incubated with carboxypeptidase B do not show decreases relative to the controls.

These specific enzyme assays showing that proteinase K and carboxypeptidase B eliminated attractant bioactivity suggests that the active horseshoe crab component is a peptide with an arginine or lysine at the carboxy terminus.

Example 7

Protein Assays

Bradford Reagent (Sigma Bradford Reagent B-6916) was used to determine protein concentration in samples. Five milliliters of Bradford Reagent were diluted into 25 ml of deionized water. One milliliter aliquots were placed into plastic cuvettes. Protein contents were measured in two different locations with two separate spectrophotometers so the protocol was different for one of the measurements. On measurement day one, varying concentrations of extract were added to the Bradford Reagent. Samples were measured at 595 nm. On all subsequent days, 7 µl of sample were added to the Bradford Reagent and measured at both 594 nm and 596 nm on a spectrophotometer (Hewlett Packard #8452A diode array spectrophotometer) and the measurements were averaged. A standard curve (FIG. 2) ranging from 0 to 100 µg of protein was generated using bovine serum albumin (BSA) to determine protein concentrations of samples. All values were in the linear range of the protein standard curve.

Based upon these protein concentration estimates, the attractant shows biological activity in the nanomolar range, which is typical for other aquatic signal molecules.

Example 8

HPLC and Mass Spectrometry 150 ul of concentrated Supernatant B was injected on a 4.6 mm×25 cm Tskgel amide-80 normal phase HPLC column. Peptides were eluted across a gradient of 0-70% over 40 minutes. Solvent A consisted of 0.1% TFA in 97:3 Acetonitrile:water; solvent B consisted of 0.1% TFA in 55:45 Acetonitrile/water. Absorbance was measured at 215 nm. Peptide peaks were concentrated via vacuum evaporation and submitted to Harvard Microchemistry Facility for MALDI-TOF analysis, Mass spectrometry data was obtained on the horseshoe crab extract using matrix-assisted laser desorption time-of-flight mass spectrometry (MALDI-TOF MS) performed on an Applied Biosystems Voyager-DE STR (Framingham, Mass.). ZipTips were used to clean up the samples of purified horseshoe crab extract to minimize polymer background. The resulting spectrum was the sum of many laser shots at high laser intensity. There was a peak at 1567 Da that was above the polymer noise, but peaks of lower mass were questionable. Observing peaks below 1000 Da was difficult due to a rising baseline and dectection limits of the system.

Although the invention is illustrated and described herein with reference to specific embodiments, the invention is not intended to be limited to the details shown. Rather, various modifications may be made in the details within the scope and range of equivalents of the claims and without departing from the invention.

We claim:

1. A composition comprising a substantially purified attractant, wherein the attractant:
    a) has a molecular weight of less than about 30 kilodaltons;
    b) is naturally present in the egg of a horseshoe crab;
    c) contains at least one peptide bond;
    d) has a lysine or arginine at its carboxy terminus;
    e) is not lipid based;
    f) is water-soluble; and
    g) functions as an attractant of aquatic organisms at about sub-molar concentrations.

2. The composition of claim 1, wherein the attractant has a molecular weight of from about 220 daltons to about 3 kilodaltons.

3. The composition of claim 1, wherein the horseshoe crab comprises *Limulus polyphemus*.

4. The composition of claim 1, wherein the aquatic organism is selected from the group consisting of eel, conch, lobster and catfish.

5. The composition of claim 1, wherein the attractant is produced by a process comprising:
   a) providing at least one horseshoe crab egg;
   b) disrupting the egg;
   c) extracting egg lysate using a suitable volume of a suitable buffer to produce an extract;
   d) filtering said extract; and
   e) treating the filtered extract to one or more centrifugation steps, heating steps or a combination of both.

6. The composition of claim 1, wherein the composition comprises a bait formulation.

7. A composition useful as an attractant or bait for aquatic organisms comprising a substantially purified peptide derived from a horseshoe crab egg, wherein said peptide has the formula, $aa_n$, where aa is an amino acid and n is an integer from about 2 to about 250.

8. The composition of claim 7, wherein said amino acid is a naturally occurring amino acids.

9. The composition of claim 7, wherein the aquatic organism is selected from the group consisting of eel, conch, lobster and catfish.

10. The composition of claim 7, wherein the concentration of said peptide is less than about 1 molar.

11. The composition of claim 7, wherein the peptide has a molecular weight of less than about 30 kilodaltons.

12. The composition of claim 11, wherein the peptide has a molecular weight of about 220 daltons to about 3 kilodaltons.

13. The composition of claim 7, further comprising a reducing agent.

14. The composition of claim 13, wherein the composition is in a form selected from the group consisting of a liquid, a gel, a powder, a spray, a cream, a solid, a semi-solid matrix, a time release matrix, a capsule, a tablet and a control release tablet.

15. An agent useful as an attractant or bait for aquatic organisms comprising a substantially purified peptide derived from a horseshoe crab egg, wherein said peptide has the formula: $aa_n - X_z$, wherein:
   aa is an amino acid;
   n is an integer from about 2 to about 250;
   X is a carboxyl terminal basic amino acid residue; and
   z is an integer $\geq 1$.

16. The composition of claim 15, wherein said amino acid is a naturally occurring amino acids.

17. The composition of claim 15, wherein said aquatic organism is selected from the group consisting of an eel, a conch, a lobster and a catfish.

18. The composition of claim 15, wherein the concentration of said peptide is less than about 1 molar.

19. The composition of claim 15, wherein the peptide has a molecular weight of less than about 30 kilodaltons.

20. The composition of claim 19, wherein the peptide has a molecular weight of about 220 daltons to about 3 kilodaltons.

21. The composition of claim 15, further comprising a reducing agent.

22. The composition of claim 21, wherein the composition is in a form selected from the group consisting of a liquid, a gel, a powder, a spray, a cream, a solid, a semi-solid matrix, a time release matrix, a capsule, a tablet and a control release tablet.

23. A method for the isolation and purification of a peptide attractant from at least one horseshoe crab egg comprising the steps of:
   a) providing at least one egg of a *Limulus polyphemus* horseshoe crab;
   b) disrupting the egg;
   c) extracting egg lysate using a suitable volume of a suitable buffer to produce an extract;
   d) filtering said extract; and
   e) treating the filtered extract to one or more centrifugation steps, heating steps or a combination of both.

24. A method of using a peptide attractant of claim 21, comprising the steps of:
   a) providing the peptide attractant, wherein the peptide is, isolated and purified directly from at least one *Limulus polyphemus*, horseshoe crab egg, a purified recombinant peptide, a synthetic peptide, or any combination thereof;
   b) providing a means for catching an aquatic organism; and
   c) adding the peptide attractant on or around the catching means.

* * * * *